(12) United States Patent
Nashimoto et al.

(10) Patent No.: US 7,962,671 B2
(45) Date of Patent: Jun. 14, 2011

(54) STORAGE APPARATUS AND METHOD OF UPDATING CONTROL INFORMATION IN STORAGE APPARATUS

(75) Inventors: Kunihiko Nashimoto, Odawara (JP); Shinichi Hiramatsu, Odawara (JP); Noboru Furuumi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 196 days.

(21) Appl. No.: 12/308,657

(22) PCT Filed: Nov. 21, 2008

(86) PCT No.: PCT/JP2008/071753
§ 371 (c)(1),
(2), (4) Date: Dec. 19, 2008

(87) PCT Pub. No.: WO2010/058488
PCT Pub. Date: May 27, 2010

(65) Prior Publication Data
US 2010/0274929 A1    Oct. 28, 2010

(51) Int. Cl.
*G06F 13/14* (2006.01)
*G06F 12/14* (2006.01)
(52) U.S. Cl. ............... 710/36; 710/5; 710/74; 711/163
(58) Field of Classification Search ............ None
See application file for complete search history.

(56) References Cited

U.S. PATENT DOCUMENTS 6,675,268 B1 * 1/2004 DeKoning et al. ......... 711/151
7,159,088 B2 * 1/2007 Hirakawa et al. ......... 711/162

FOREIGN PATENT DOCUMENTS

EP    1 986 090 A2    1/2008
JP    2007-249729     3/2006

* cited by examiner

*Primary Examiner* — Ilwoo Park
(74) *Attorney, Agent, or Firm* — Stites & Harbison, PLLC; Juan Carlos A. Marquez, Esq

(57) ABSTRACT

A storage apparatus 10 includes channel devices (each being CHA_PK 11) and microprocessors (each being MP_PK 12). CHA_PK 11 and MP_PK 12 respectively store therein control information being information designating logical volumes (LDEVs) 171 accessible by respective MP_PKs 12. Upon receipt of an I/O request from a management apparatus 20, CHA_PK 11 transmits, based on the control information stored therein, an I/O command to MP_PK 12 having an access right to a logical volume to which the I/O request is directed. In the storage apparatus 10, MP_PK 12 having received the I/O command from CHA_PK 11 judges based on the control information stored therein whether MP_PK 12 itself has an access right to the logical volume, and transmits the control information therein to CHA_PK 11 when judging that it does not have the access right, whereby the control information in CHA_PK 11 is updated.

2 Claims, 18 Drawing Sheets

STORAGE APPARATUS AND METHOD OF UPDATING CONTROL INFORMATION IN STORAGE APPARATUS

TECHNICAL FIELD

The present invention relates to a storage apparatus, and a method of updating control information in a storage apparatus. Particularly, the present invention relates to a technology for reducing, in a storage apparatus including multiple microprocessors, an influence on a host apparatus, which is caused by processing for updating control information in the microprocessors.

BACKGROUND ART

Japanese Patent Application Laid-open Publication No. 2007-249729, for example, describes a storage system including multiple microprocessors, which is designed to prevent load concentration on one microprocessor. In this storage system, when a microprocessor that performs I/O processing in response to an I/O request received from an upper-level apparatus has a load higher than a predetermined load, the microprocessor causes another microprocessor to execute the high-load part of the I/O processing.

In a storage apparatus including multiple microprocessors, it is necessary to properly manage control information in the microprocessors. Especially when such control information is frequently updated, it is necessary to reduce an influence (overhead) on a host apparatus, which is caused by processing for updating the control information.

DISCLOSURE OF THE INVENTION

The present invention has been made in view of the above described background, and an object thereof is to provide a storage apparatus and a method of updating control information in a storage apparatus, which are capable of reducing, in a storage apparatus including multiple microprocessors, influence on a host apparatus, which is caused by processing for updating control information in the microprocessors.

In order to solve the above and other problems, a storage apparatus according to a first aspect of the present invention includes: a plurality of channel packages communicating with an external apparatus; a plurality of microprocessor packages; a disk package that controls a disk device; and a cache memory accessible by the channel packages and the microprocessor packages, wherein: the disk device provides logical volumes which are based on a storage area of a physical disk; the channel packages and the microprocessor packages store therein control information designating which ones of the logical volumes accessible by the respective microprocessor packages; when any one of the channel packages receives an I/O request from the external apparatus, the one channel package specifies, based on the control information stored therein, one of the microprocessor packages which has an access right to one of the logical volumes to which the I/O request is directed, and then transmits an I/O command to the specified microprocessor package; upon receipt of the I/O command from the one channel package, the specified microprocessor package judges based on the control information stored therein whether the specified microprocessor package itself has an access right to the one logical volume to which the I/O command is directed; the specified microprocessor package transmits a disk I/O to the disk package when judging that the specified microprocessor package has the access right to the one logical volume; the specified microprocessor package transmits the control information stored therein to the one channel package having transmitted the I/O command when judging that the specified microprocessor package does not have the access right to the one logical volume to which the I/O command is directed; and the one channel package receives the control information from the specified microprocessor package, updates based on the received control information the control information stored therein, based on the updated control information, newly specifies another one of the microprocessor packages which has an access right to the one logical volume to which the I/O request is directed, and transmits an I/O command to the newly specified microprocessor package.

The storage apparatus according to the first aspect of the present invention may be configured so that: when transmitting the I/O command to the newly specified microprocessor package, the one channel package transmits the updated control information along with the I/O command to the newly specified microprocessor package; and upon receipt of the I/O command and the updated control information from the one channel package, the newly specified microprocessor package updates, based on the received control information, the control information stored therein, judges based on the updated control information whether the newly specified microprocessor package itself has an access right to the one logical volume to which the I/O command is directed, and transmits a disk I/O to the disk package when judging that the newly specified microprocessor package has the access right to the one logical volume.

The storage apparatus according to the first aspect of the present invention may further include a shared memory accessible by the microprocessor packages, wherein: the control information in an updated status is stored in the shared memory; when transmitting the I/O command to the newly specified microprocessor package, the one channel package transmits a notification along with the I/O command to the newly specified microprocessor package, the notification indicating that the control information has been updated; and upon receipt of the I/O command and the notification, the newly specified microprocessor package accesses the shared memory to acquire the control information stored in the shared memory, updates, based on the acquired control information, the control information stored therein, judges based on the updated control information whether the newly specified microprocessor package itself has an access right to the one logical volume to which the I/O command is directed, and transmits a disk I/O to the disk package when judging that the newly specified microprocessor package has the access right to the one logical volume.

A storage apparatus according to a second aspect of the present invention includes: a plurality of channel packages communicating with an external apparatus; a plurality of microprocessor packages; a disk package that controls a disk device; a cache memory accessible by the channel packages and the microprocessor packages; and a shared memory accessible by the channel packages, wherein: control information in an updated status is stored in the shared memory; the disk device provides logical volumes which are based on a storage area of a physical disk; the channel packages and the microprocessor packages store therein control information designating which ones of the logical volumes are accessible by the respective microprocessor packages; when any one of the channel packages receives an I/O request from the external apparatus, the one channel package specifies, based on the control information stored therein, one of the microprocessor packages which has an access right to one of the logical volumes to which the I/O request is directed, and transmits an I/O command to the specified microprocessor package; upon receipt of the I/O command from the one channel package, the specified microprocessor package judges based on the control information stored therein whether the specified microprocessor package itself has an access right to the one logical volume to which the I/O command is directed, the specified microprocessor package transmits a disk I/O to the disk package when judging that the specified microprocessor package has the access right to the one logical volume, and the specified microprocessor package transmits a notification to the one channel package having transmitted the I/O command, the notification indicating that the specified microprocessor package does not have the access right to the one logical volume, when judging that the specified microprocessor package does not have the access right to the one logical volume to which the I/O command is directed; and upon receipt of the notification, the one channel package accesses the shared memory to acquire the control information stored in the shared memory, updates, based on the acquired control information, the control information stored therein, based on the updated control information, newly specifies another one of the microprocessor packages which has an access right to the one logical volume to which the I/O request is directed, and transmits an I/O command to the newly specified microprocessor package.

The storage apparatus according to the second aspect of the present invention may be configured so that: when transmitting the I/O command to the newly specified microprocessor package, the one channel package transmits the updated control information along with the I/O command; and upon receipt of the I/O command and the control information from the one channel package, the newly specified microprocessor package updates, based on the received control information, the control information stored therein, judges based on the updated control information whether the newly specified microprocessor package itself has an access right to the one logical volume to which the I/O command is directed, and transmits a disk I/O to the disk package when judging that the newly specified microprocessor package has the access right to the one logical volume.

The storage apparatus according to the second aspect of the present invention may be configured so that: the shared memory is accessible by the microprocessor packages; when transmitting the I/O command to the newly specified microprocessor package, the one channel package transmits a notification along with the I/O command to the newly specified microprocessor package, the notification indicating that the control information has been updated; and upon receipt of the I/O command and the notification, the newly specified microprocessor package accesses the shared memory to acquire the control information stored in the shared memory, updates, based on the acquired control information, the control information stored therein, judges based on the updated control information whether the newly specified microprocessor package itself has an access right to the one logical volume to which the I/O command is directed, and transmits a disk I/O to the disk package when judging that the newly specified microprocessor package has the access right to the one logical volume.

In the storage apparatus according to any one of the first and second aspects of the present invention, the control information stored in the microprocessor packages is updated by at least any one of: a first method in which the microprocessor packages are communicably connected to a management apparatus which provides the control information, receive the control information transmitted from the management apparatus, and update, based on the received control information, the control information stored in themselves; a second method in which the microprocessor packages are communicably connected to a management apparatus which provides the control information, and are also communicably connected to each other, any one of the microprocessor packages transmits the control information stored therein to the other ones of the microprocessor packages, and upon receipt of the control information, the other ones of the microprocessor packages update, based on the received control information, the control information stored in themselves; and a third method in which the microprocessor packages are communicably connected to a management apparatus which provides the control information, and are provided with a shared memory accessible by the microprocessor packages, the management apparatus stores the control information in the shared memory, and at the same time notifies the microprocessor packages of the storing, and upon receipt of the notification, the microprocessor packages access the shared memory, acquire the control information therefrom, and update, based on the acquired control information, the control information stored in themselves.

Other problems disclosed by the present invention and solutions thereto will become apparent from the description of the embodiments of the invention and appended drawings.

According to the present invention, an influence on the host apparatus, which is caused by processing for updating the control information in the microprocessors, namely, an overhead can be reduced.

MODE FOR CARRYING OUT THE INVENTION

Figure 1A:
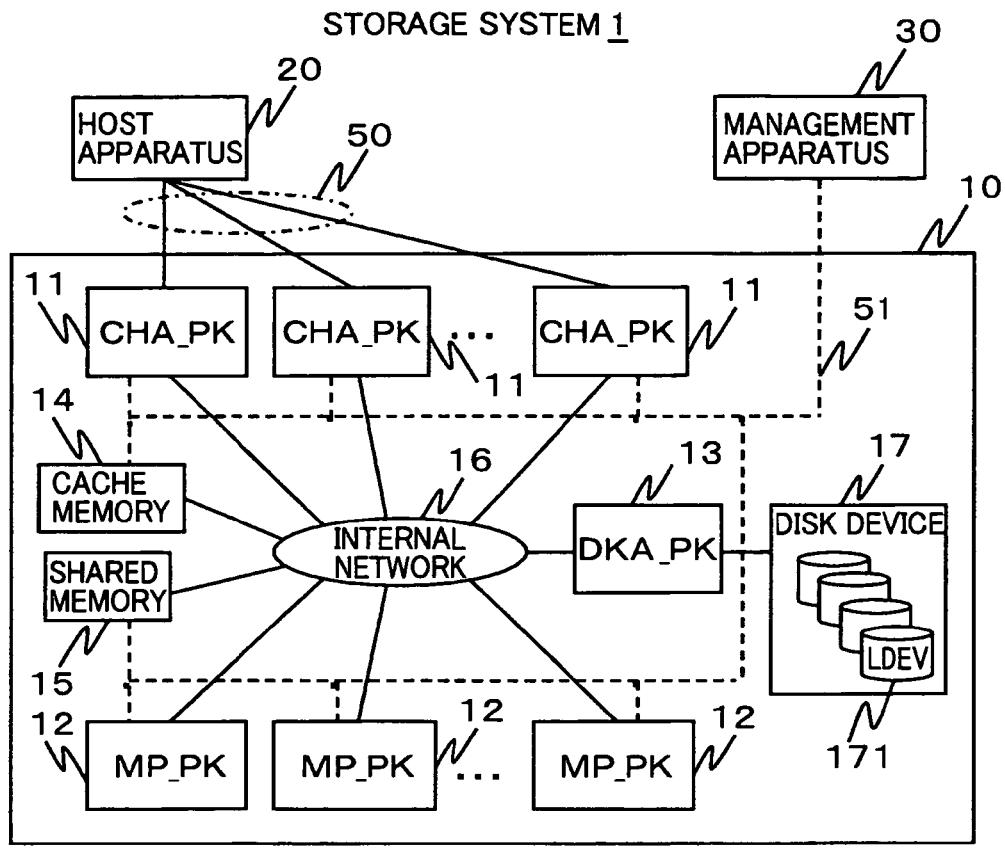
FIG. 1A is a diagram showing a schematic configuration of a storage system 1.

Hereinbelow, an embodiment will be described. A schematic configuration of a storage system 1 is shown in FIG. 1A. As shown in this diagram, this storage system 1 includes a storage apparatus 10, at least one host apparatus 20 and at least one management apparatus 30. The host apparatus 20 and the storage apparatus 10 are communicatively connected with each other via communication means 50 which is, for example, a LAN (Local Area Network), a SAN (Storage Area Network), the Internet, a public communication line, a dedicated line or the like. Additionally, the management apparatus 30 and the storage apparatus 10 are communicatively connected with each other via the communication means 50 which is, for example, a LAN, the Internet or the like.

The storage apparatus 10 includes multiple channel packages (each of which will be referred to as CHA_PK 11 hereinafter), multiple microprocessor packages (each of which will be referred to as MP_PK 12 hereinafter), at least one disk package (which will be referred to as DKA_PK 13 hereinafter), a cache memory 14, a shared memory 15, an internal network 16, and a disk device 17.

Figure 2A:
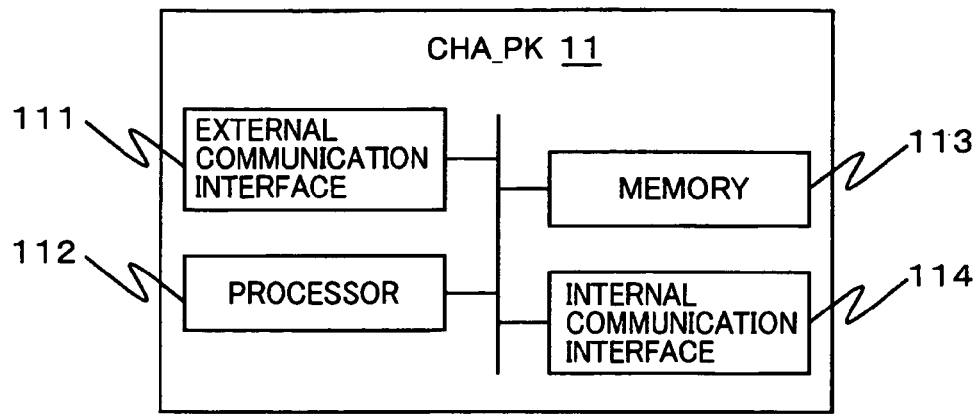
FIG. 2A is a diagram showing a hardware configuration of CHA_PK 11.
Figure 2B:
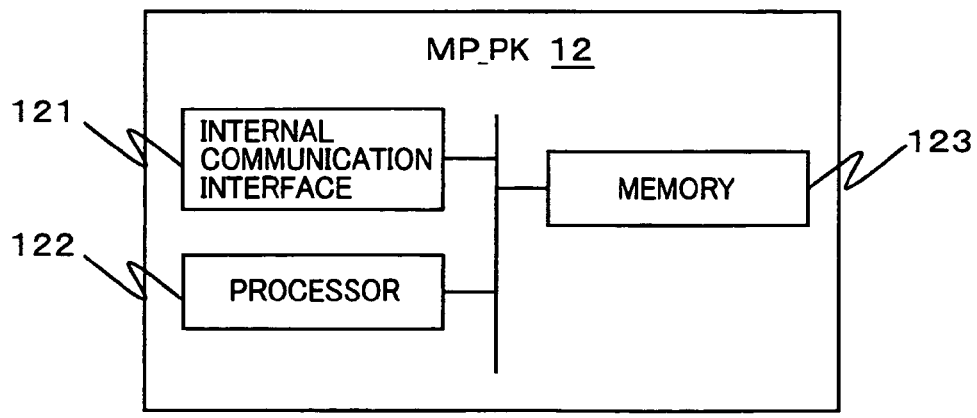
FIG. 2B is a diagram showing a hardware configuration of MP_PK 12.
Figure 2C:
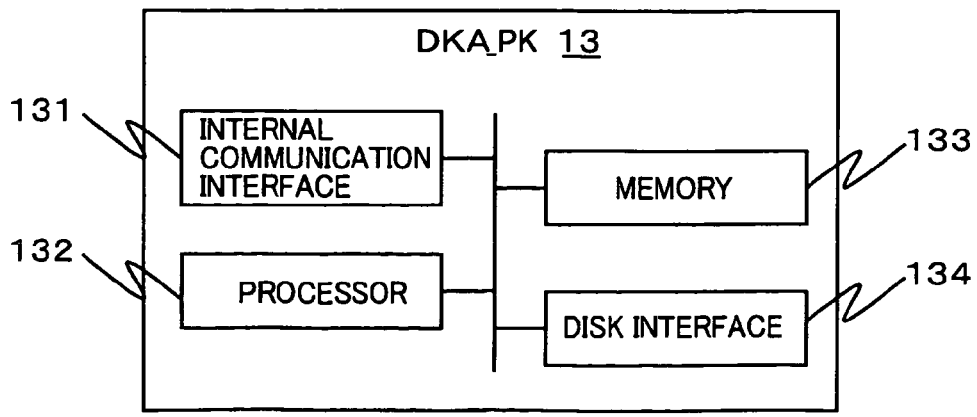
FIG. 2C is a diagram showing a hardware configuration of DKA_PK 13.

Hardware configurations of CHA_PK 11, MP_PK 12, and DKA_PK 13 are shown in FIGS. 2A to 2C.

As shown in FIG. 2A, CHA_PK 11 includes an external communication interface 111, a processor 112, a memory 113 and an internal communication interface 114. The external communication interface 111 performs communications with, for example, the host apparatus 20, the communications conforming to a communication standard such as Ethernet (registered trademark) or Fibre Channel. The external communication interface 111 is, for example, a NIC (Network Interface Card) or an HBA (Host Bus Adapter).

The processor 112 is, for example, a CPU (Central Processing Unit) or an MPU (Micro Processing Unit). The memory 113 is, for example, a RAM (Random Access Memory) or a ROM (Read Only Memory). The internal communication interface 114 communicates with MP_PK 12, DKA_PK 13, the cache memory 14 and the shared memory 15 via the internal network 16. CHA_PK 11 functions as a so-called protocol processor by mainly performing processing related to communication protocols.

As shown in FIG. 2B, MP_PK 12 includes an internal communication interface 121, a processor 122 and a memory 123. The internal communication interface 121 communicates with CHA_PK 11, DKA_PK 13, the cache memory 14 and the shared memory 15 via the internal network 16. The processor 122 is constituted, for example, by use of an MPU or a DMA (Direct Access Memory). The memory 123 is a RAM or a ROM.

As shown in FIG. 2C, DKA_PK 13 includes an internal communication interface 131, a processor 132, a memory 133 and a disk interface 134. The internal communication interface 131 communicates with CHA_PK 11, MP_PK 12, the cache memory 14 and the shared memory 15 via the internal network 16. The processor 132 is, for example, a CPU or an MPU. The memory 133 is a RAM or a ROM. The disk interface 134 communicates mostly with the disc device 17.

In the cache memory 14, data (write data) to be written onto the disk device 17 and data (read data) read out from the disk device 17 are temporarily stored. Via the internal network 16, CHA_PK 11, MP_PK 12 and DKA_PK 13 respectively access data stored in the cache memory 14. The cache memory 14 includes a processor and a memory.

In the shared memory 15, mainly, information used for controlling the storage apparatus 10 is stored. Via the internal network 16, CHA_PK 11, MP_PK 12 and DKA_PK 13 respectively access data stored in the shared memory 15. Owner right information (control information), discussed later, is stored in the shared memory 15.

The disk device 17 includes multiple hard disk drives (physical disks). The disk device 17 is, for example, a disk array device. The hard disk drives are controlled by RAID (Redundant Arrays of Inexpensive (or Independent) Disks). The disk device 17 provides logical storage areas (logical volumes) constituted by use of storage areas of the hard disk drives. Each of the logical volumes is, for example, an LDEV 171 (where LDEV stands for Logical Device) which is a storage area (for example, a storage area of a RAID group) provided by the RAID.

The internal network 16 is constituted by use of, for example, a high-speed cross bar switch. The internal network 16 can also be constituted as a LAN or a SUN. A protocol such as TCP/IP, Fibre channel, or iSCSI (internet Small Computer System Interface) is used for the communication by the internal network 16.

The host apparatus 20 is, for example, a personal computer, an office computer, or a main frame. Communication between the host apparatus 20 and the storage apparatus 10 is performed in conformity with such a protocol as TCP/IP, FICON (Fibre Connection) (registered trademark), ESCON (Enterprise System Connection) (registered trademark), ACONARC (Advanced Connection Architecture) (registered trademark), or FIBARC (Fibre Connection Architecture) (registered trademark). The host apparatus 20 transmits an I/O request, for example, on a block basis, on a chunk basis, or on a file basis.

The management apparatus 30 is, for example, a personal computer or an office computer. The management apparatus 30 may be integrated (packaged in a housing) with the storage apparatus 10. The management apparatus 30 is communicatively connected with CHA_PK 11, MP_PK 12, DKA_PK 13, a cache memory 14 and a shared memory 15 via communication means 51 (instead of which the internal network 16 may be used) for management purposes. The management apparatus 30 includes a user interface which is based on GUI (Graphic User Interface), CLI (Command Line Interface) or the like. The management apparatus 30 controls and monitors the storage apparatus 10. Additionally, the management apparatus 30 manages owner right information, discussed later.

Figure 1B:
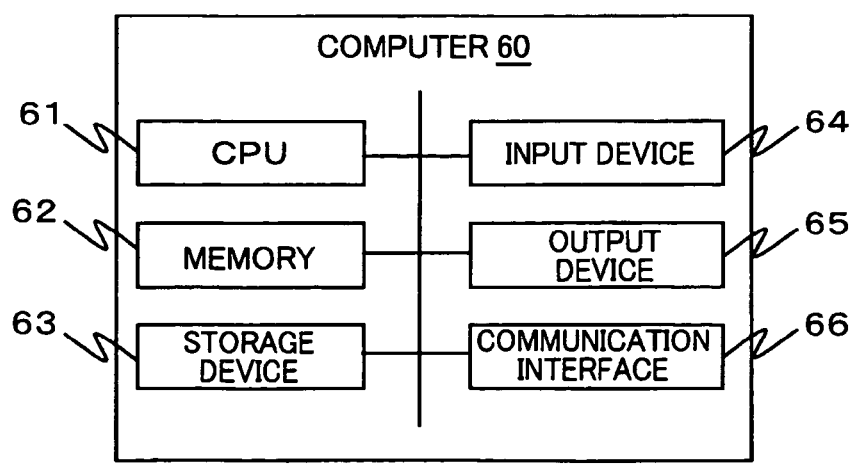
FIG. 1B is a diagram showing one example of a computer (information processing apparatus) usable as a host apparatus 20 or a management apparatus 30.

FIG. 1B shows one example of a computer (information processing apparatus) usable as the host apparatus 20 or the management apparatus 30. This computer 60 includes a CPU 61, a volatile or nonvolatile memory 62 (a RAM or a ROM), a storage device 63 (for example, a hard disk or a semiconductor storage device (SSD (Solid State Drive))), an input device 64 such as a keyboard and a mouse, an output device 65 such as a liquid crystal monitor and a printer, and a communication interface 66 such as an NIC or an HBA.

Figure 3A:
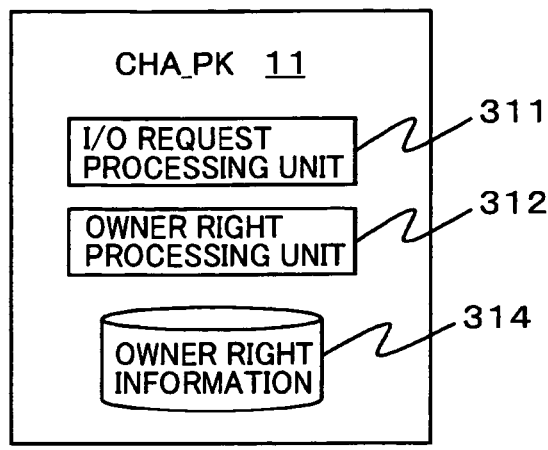
FIG. 3A is a diagram showing functions of CHA_PK 11.
Figure 3B:
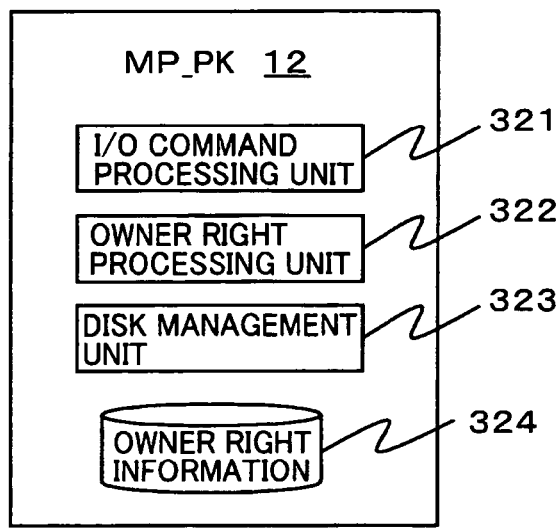
FIG. 3B is a diagram showing functions of MP_PK 12.
Figure 3C:
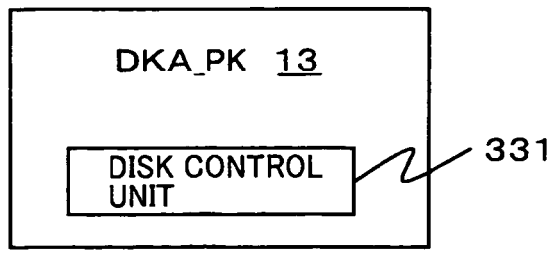
FIG. 3C is a diagram showing functions of DKA_PK 13.

FIGS. 3A to 3C show functions of CHA_PK 11, MP_PK 12 and DKA_PK 13.

As shown in FIG. 3A, CHA_PK 11 includes an I/O request processing unit 311 and an owner right processing unit 312. The I/O request processing unit 311 receives an I/O request (for example, a data write request or a data read request)

transmitted from the host apparatus 20. The I/O request contains: write data to the LDEVs 171; and information specifying one of the LDEVs 171 which is subjected to data write or data read.

The I/O request processing unit 311 transmits to MP_PK 12: an I/O command (a data write command or a data read command) corresponding to the I/O request; and data (for example, write data). The I/O request processing unit 311 transmits to the host apparatus 20 (or responds to the host apparatus 20 with) a result (such as read data or transmission of a write completion report to the host apparatus 20) obtained by processing performed by the storage apparatus 10 in accordance with the I/O request.

The owner right processing unit 312 manages the later discussed owner right information 314 (control information) stored in the memory 113 in CHA_PK 11. The owner right processing unit 312 transmits to and receives from MP_PK 12 information on management of the owner right information 314. The owner right processing unit 312 accesses the shared memory 15 to acquire the updated owner right information 314 stored in the shared memory 15.

Incidentally, CHA_PK 11 may include a function of NAS (Network Attached Storage). In this case, in addition to the functions shown in FIG. 3A, CHA_PK 11 further includes a function of a file system and the like, the file system being: a file sharing system such as an NFS (Network File System) or a CIFS (Common Internet File System); a FAT (File Allocation Table); an NTFS (NT File System); a UNIX (registered trademark) file system; or the like.

Each of the functions described above of CHA_PK 11 is implemented by a function which hardware of CHA_PK 11 has, or by having the processor 112 of CHA_PK 11 readout and execute a program stored in the memory 113.

As shown in FIG. 3B, MP_PK 12 includes an I/O command processing unit 321, an owner right processing unit 322 and a disk management unit 323. The I/O command processing unit 321 receives an I/O command transmit from CHA_PK 11 (such as a data write command or a data read command), and then performs processing (for example, requesting DKA_PK 13 to issue a disk I/O (data write or data read), or transferring necessary data (for example, write data) to DKA_PK 13) corresponding to the received I/O command. Additionally, the I/O command processing unit 321 transmits to CHA_PK 11 a result (such as read data or a write completion report) obtained by the processing corresponding to the I/O command.

Furthermore, when performing the processing related to the received I/O command, the I/O command processing unit 321 does the followings and the like: writing onto the cache memory 14 write data inputted from the host apparatus 20 via CHA_PK 11; staging data onto or destaging data from the cache memory 14; and managing data stored in the shared memory 15.

The owner right processing unit 322 manages owner right information 324 stored in the memory 123 in MP_PK 12. The owner right processing unit 322 transmits to and receives from CHA_PK 11 information on management of the owner right information 324. The owner right processing unit 322 acquires update information for the owner right information 314 from the shared memory 15. The disk management unit 323 performs various kinds of control over the RAID.

Each of the functions described above of MP_PK 12 is implemented by a function which hardware of MP_PK 12 has, or by having the processor 122 of MP_PK 12 readout and execute a program stored in the memory 123.

As shown in FIG. 3C, DKA_PK 13 includes a disk control unit 331. The disk control unit 331 performs control over hardware of the disk device 17, and performs a disk I/O directed to the disk device 17 upon receipt of a disk-I/O issue request transmitted from MP_PK 12.

Each of the functions described above of DKA_PK 13 is implemented by a function which hardware of DKA_PK 13 has, or by having the processor 132 of DKA_PK 13 readout and execute a program stored in the memory 133.

Owner Right:

The management apparatus 30 manages access rights (hereinafter, referred to as owner rights) to the respective LDEVs 171, the access rights being set up for each MP_PK 12 included in the storage apparatus 10. Each MP_PK 12 cannot access a particular LDEV 171 when not being set up as having an owner right to that particular LDEV 171. In this manner, in the storage apparatus 10, a range of the LDEVs 171 accessible by each MP_PK 12 is managed by means of the owner rights. The owner rights are set up, for example, for the purpose of preventing specific one of MP_PKs 12 from suffering concentration of a load in accessing the LDEVs 17.

Incidentally, in this embodiment, the owner right to each of the LDEVs 171 is set up only for any one of MP_PKs 12. In other words, only one MP_PK 12 has the owner right to certain one of the LDEVs 171 at any given point in time.

The management apparatus 30 includes a user interface for managing the owner rights. A user, an operator or the like can set up the owner rights by using the abovementioned interface.

The owner rights are set up manually or automatically, for example, when a load balance among MP_PKs 12 is adjusted. The owner rights are set up as appropriate, for example, on such occasions as when the storage apparatus 10 is installed, when maintenance of the storage apparatus 10 is performed, and when a hard disk is added in or reduced from MP_PK 12 or the disk device 17 (when any change in a configuration of the LDEVs 171 occurs).

Figure 4:
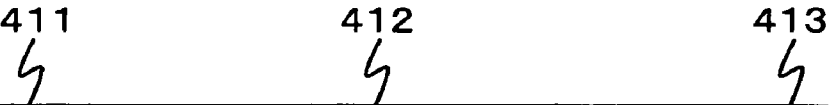
FIG. 4 is a diagram showing one example of owner right information.

The management apparatus 30 manages the owner rights respectively set up for MP_PKs 12 in the form of a table (hereinafter, referred to as owner right information). FIG. 4 shows one example of the owner right information. As shown in this diagram, owner right information 400 is constituted of multiple records each composed of items which are "MP_PK_ID 411", "LDEV group_ID 412" and "LDEV_ID 413". In MP_PK_ID 411, an identifier (MP_PK_ID) assigned to each MP_PK 12 is stored. In LDEV group_ID 412, an ID of a group (LDEV group_ID) to which each of the LDEVs 171 belongs is stored. In LDEV_ID 413, an identifier (LDEV_ID) assigned to each of the LDEVs 171 is stored.

In the case of the owner right information 400 shown in this diagram, for example, those of the LDEVs 171 that are accessible by MP_PK 12 having MP_PK_ID of "00" are those that belong to a group having LDEV group_ID of "00" and that have LDEV_IDs of "00 to FF", and those that belong to a group having LDEV group_ID of "01" and that have LDEV_IDs of "00 to FF". Additionally, those of the LDEVs 171 that are accessible by MP_PK 12 having MP_PK_ID of "01" are those that belong to a group having LDEV group_ID of "02" and that have LDEV_IDs of "00 to FF". Moreover, those of the LDEVs 171 that are accessible by MP_PK 12 having MP_PK_ID of "02" are those that belong to a group having LDEV group_ID of "03" and that have LDEV_IDs of "00 to FF".

CHA_PK 11 or MP_PK 12 acquires the owner right information from the shared memory 15 when, for example, the storage apparatus 10 is started up. When the storage apparatus 10 is in operation, the owner right information is retained in the memory 113 of each CHA_PK 11 and the memory 123 of each MP_PK 12. The owner right information retained in each CHA_PK 11 and each MP_PK 12 is updated to the latest status as appropriate actively by CHA_PK 11 and MP_PK 12, or passively through intervention of the management apparatus 30.

Figure 5A:
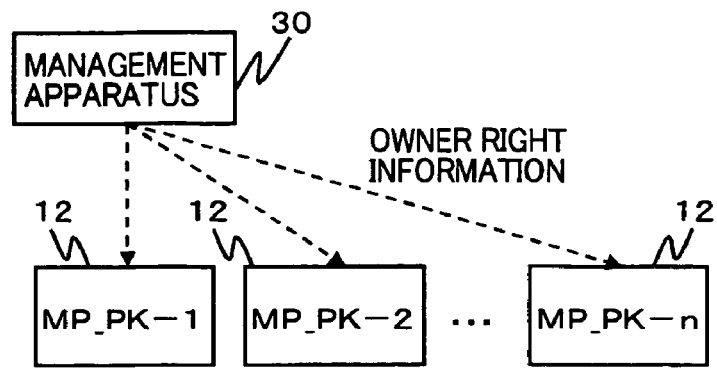
FIG. 5A is a diagram showing one aspect of a method of updating owner right information in MP_PK 12.
Figure 5B:
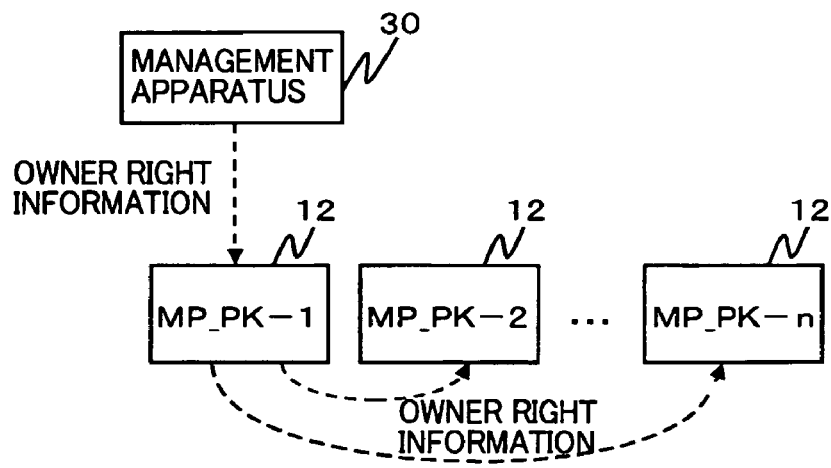
FIG. 5B is a diagram showing another aspect of the method of updating the owner right information in MP_PK 12.
Figure 5C:
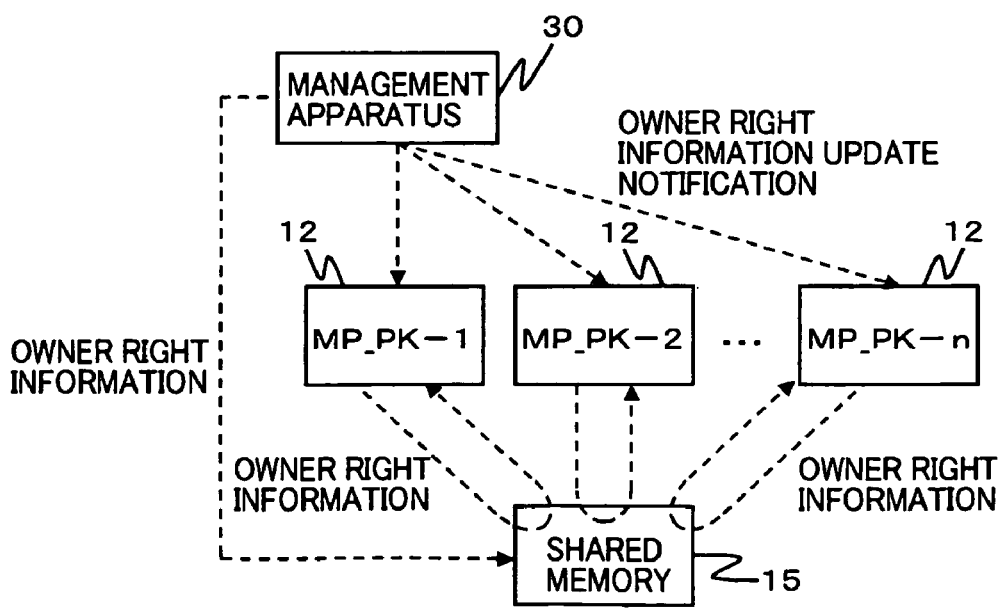
FIG. 5C is a diagram showing still another aspect of the method of updating the owner right information in MP_PK 12.

FIGS. 5A to 5C show aspects of methods of updating the owner right information in MP_PK 12. In the storage apparatus 10, the owner right information in MP_PK 12 is updated to the latest contents as appropriate by these aspects of the methods.

FIG. 5A shows one aspect of a method of updating the owner right information in each MP_PK 12. In the aspect shown in this drawing, the owner right information is transmitted from the management apparatus 30 to each MP_PK 12 via the communication means 51. Then, each MP_PK 12 individually receives the transmitted owner right information, and stores it in the memory 123 of its own.

FIG. 5B shows another aspect of a method of updating the owner right information in each MP_PK 12. In the aspect shown in this drawing, the owner right information is firstly transmitted from the management apparatus 30 to a certain one (denoted as MP_PK-1 in this drawing) or more specific MP_PKs 12, whereby the owner right information is stored in the memories 123 of those specific MP_PKs 12. Thereafter, the owner right processing unit 322 included in each MP_PK 12 causes the owner right information to be transferred from those specific MP_PKs 12 to the other ones of MP_PKs 12 (from MP_PK-1 to MP_PK-2 and to MP_PK-3 in this drawing) via the communication means 51. Then, upon receipt of the owner right information, the other ones of MP_PKs 12 store it in the memories 123 of their own. The entirety of the owner right information may be transmitted at one delivery, or, only a difference of the owner right information resulting from the updating may be transmitted when owner right information is already stored in MP_PKs 12.

Incidentally, the owner right information 400 may be updated not in a manner being transferred in a 1-to-N correspondence (from MP_PK-1 to the other ones, MP_PK-2 and MP_PK-3), but in a relayed manner being transferred from MP_PK-1 to MP_PK-2 and then from MP_PK-2 to MP_PK-3. In this case also, only a difference resulting from the updating may be transmitted as the owner right information.

FIG. 5C shows still another aspect of a method of updating the owner right information in each MP_PK 12. In this aspect, the management apparatus 30 stores the owner right information in the shared memory 15, and then transmits from the management apparatus 30 an update notification regarding the owner right information to each MP_PK 12. Each MP_PK 12 having received the update information then individually accesses the shared memory 15 to acquire the owner right information. Incidentally, the owner right information to be stored in the shared memory 15 may include its entirety, or may include only a difference resulting from the updating.

In the storage apparatus 10, the owner right information retained by each MP_PK 12 is updated to the latest contents according to any one of the above described aspects.

Incidentally, any one of the delivering manners described above can be applied to a case where the owner right information is delivered to each CHA_PK 11. That is, the owner right information retained by each CHA_PK 11 can be updated in the same manner as when the owner right information retained by each MP_PK 12 is updated.

Description of Processing:

Next, description will be given of basic operation of the storage apparatus 10 performed upon receipt of an I/O request from the host apparatus 20.

Figure 6:
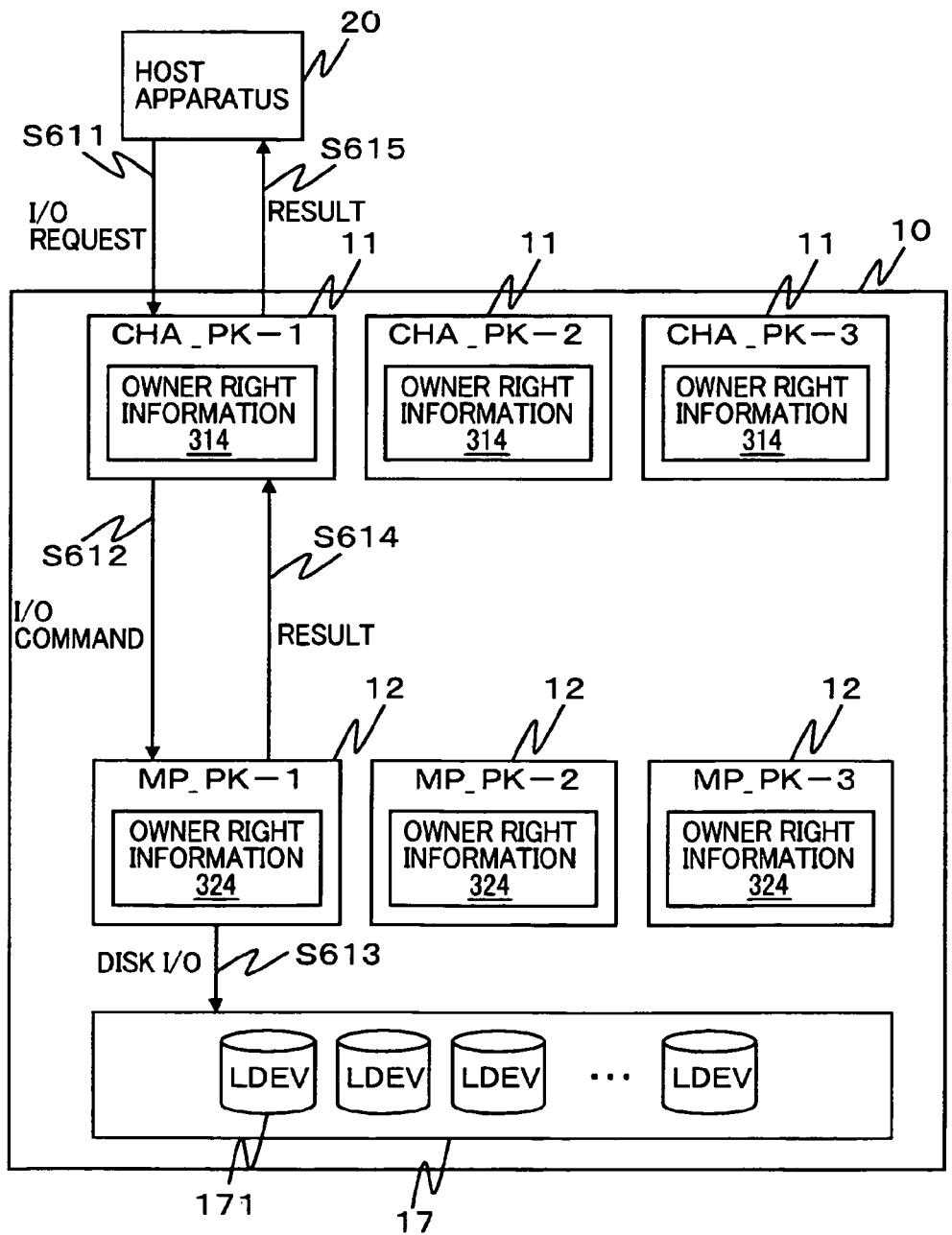
FIG. 6 is a diagram explaining a basic processing manner of a storage apparatus 10.

FIG. 6 shows basic operation of the storage apparatus 10 performed when certain one (hereinafter, denoted as CHA_PK_1) of CHA_PKs 11 has received an I/O request from the host apparatus 20.

As shown in this drawing, upon receipt of an I/O request from the host apparatus 20 (S611), CHA_PK_1 refers to the owner right information 314 stored in the memory 113 of its own, and thereby specifies MP_PK 12 having the owner right to one of the LDEVs 171 which is designated as an access target in the I/O request. Then, CHA_PK_1 transmits an I/O command to MP_PK 12 thus specified (denoted as MP_PK_1 here) (S612).

Upon receipt of the I/O command, MP_PK_1 refers to the owner right information 324 stored in the memory 123 of its own, and thereby judges whether it has the owner right to the LDEV 171 designated as the access target in the I/O command. Then, upon confirmation that MP_PK_1 has the owner right to the designated LDEV 171, MP_PK_1 transmits to DKA_PK 13 a disk I/O directed to the LDEV 171 which is the access target (S613).

Upon receipt of a result of the disk I/O from DKA_PK 13, MP_PK_1 transmits this result to CHA_PK_1 (S614). Upon receipt of the result transmitted from MP_PK_1, CHA_PK_1 transmits this result to the host apparatus 20 (S615).

As has been described above, upon receipt of an I/O request from the host apparatus 20, CHA_PK 11 transmits an I/O command to MP_PK 12 specified by the owner right information 314 retained by CHA_PK 11 itself. Upon receipt of the I/O command, MP_PK 12 refers to the owner right information 324 stored in the memory 123 of its own, and thereby judges whether it has the owner right to one of the LDEVs 171 which is an access target. Then, if it has the owner right to the target LDEV 171, MP_PK 12 transmits a disk I/O directed to the LDEV 171 which is the access target, and a result of the disk I/O is transmitted to the host apparatus 20.

Incidentally, the basic operation shown in FIG. 6 premises that contents of the owner right information retained by any one of CHA_PKs 11 and MP_PKs 12 are the same as (synchronous with) those retained by any other one of them. However, there may be a case where the updating in an entirety of the storage apparatus 10 has not been completed yet while the processing of updating the owner right information described in connection with FIGS. 5A to 5C for example is going on in the background. In such a case, contents of the owner right information retained by any one of CHA_PKs 11 and MP_PKs 12 may be different from (asynchronous with) those retained by some other ones of them. There may also be a case where the owner right information in some of CHA_PKs 11 and MP_PKs 12 has not been correctly updated due to some trouble or abnormality while the updating of the owner right information has been completed. In such a case, contents of the owner right information retained by any one of CHA_PKs 11 and MP_PKs 12 may be different from (asynchronous with) those retained by some other ones of them.

With this being the situation, description will be given hereinbelow of operation of the storage apparatus 10 performed when contents of the owner right information 314 retained by any one of CHA_PKs 11 or MP_PKs 12 different from (asynchronous with) those retained by some other ones of them.

<First Aspect>

Figure 7A:
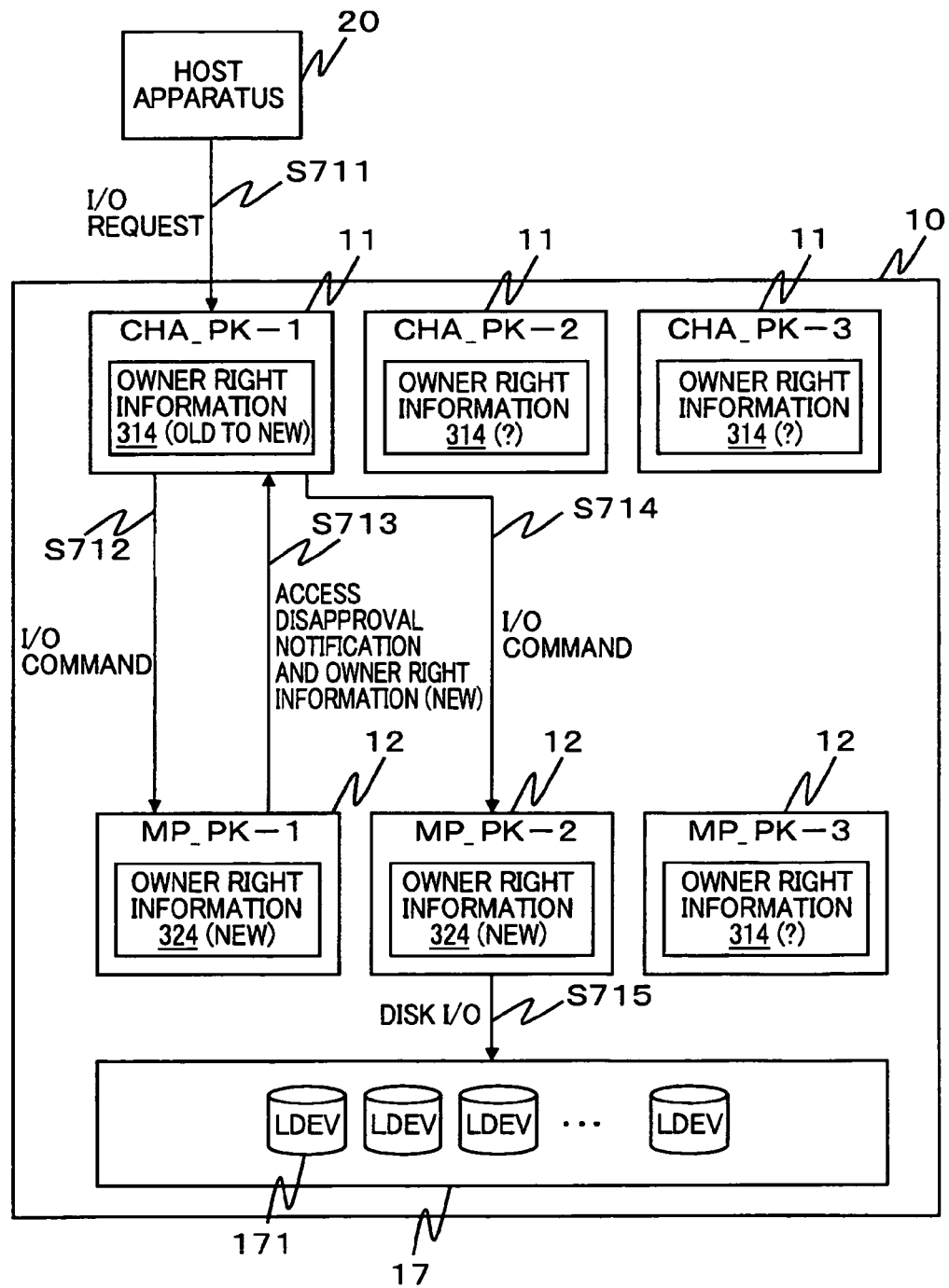
FIG. 7A is a diagram explaining a first aspect.
Figure 7B:
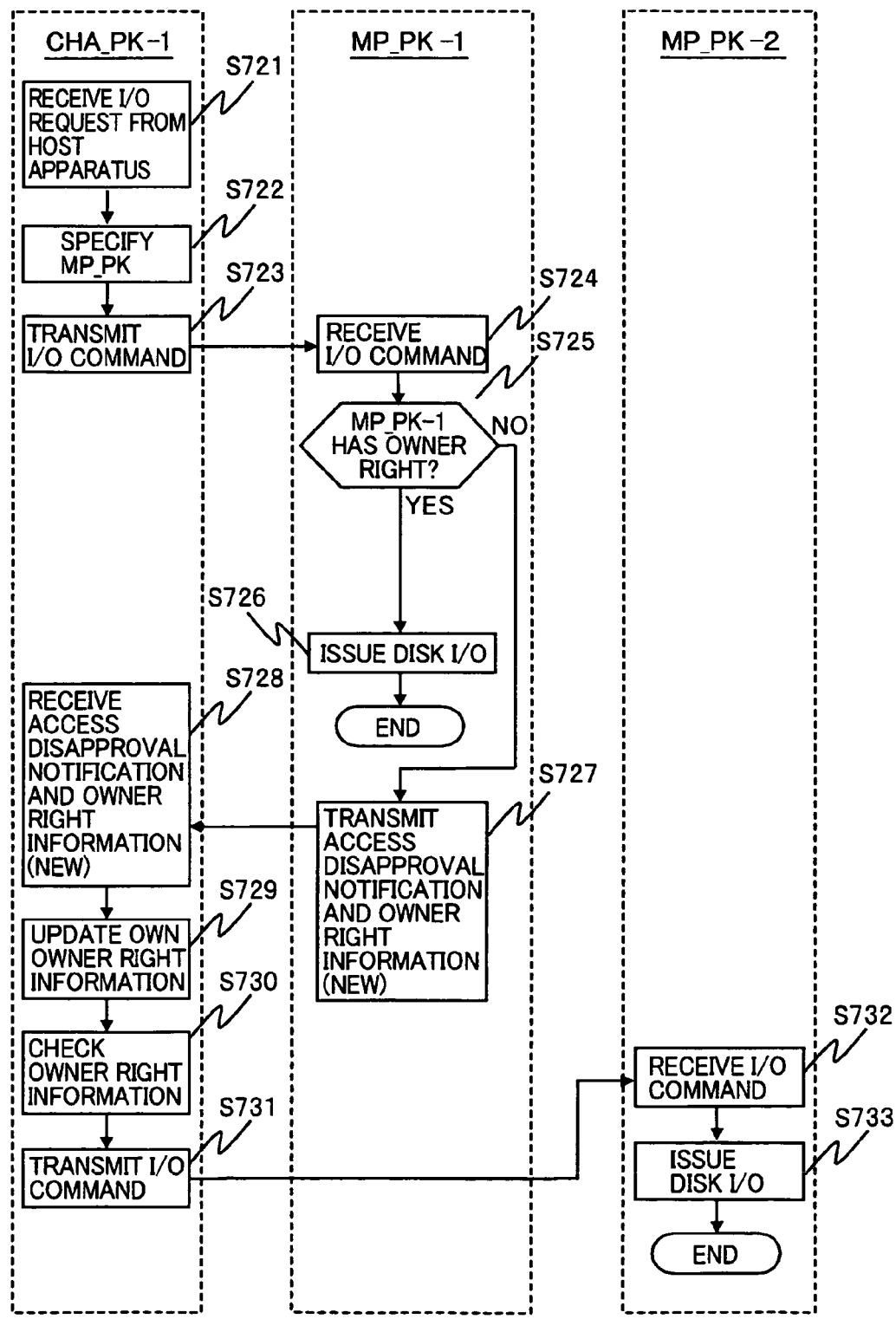
FIG. 7B is a flowchart explaining processing of the storage apparatus 10 in the first aspect.

FIG. 7A is a diagram explaining one aspect (a first aspect) of the operation of the storage apparatus 10 performed when contents of the owner right information 314 are different from (asynchronous with) the latest contents. Additionally, FIG. 7B is a flowchart explaining processing of the storage apparatus 10 in the first aspect. Hereinbelow, the first aspect will be described in connection with each of these drawings.

In the first aspect, it is assumed that, while the owner right information in MP_PKs 12 is already updated, the owner right information in CHA_PKs 11 is not yet updated. Hereinbelow, description will be given of a case where, while the owner right information in MP_PK_1 and MP_PK_2 is already updated, the owner right information in CHA_PK_1 is not yet updated.

First of all, description will be given in connection with FIG. 7A. Upon receipt of an I/O request from the host apparatus 20 (S711), CHA_PK_1 refers to the owner right information 314 stored in the memory 113 of its own, and thereby specifies MP_PK 12 having the owner right to one of the LDEVs 171 which is designated as an access target in the I/O request. Then, CHA_PK_1 transmits an I/O command to MP_PK 12 thus specified (it is assumed that MP_PK_1 is specified here) (S712).

Upon receipt of the I/O command from CHA_PK_1, MP_PK_1 refers to the owner right information 324 retained by itself, and thereby judges whether it currently has the owner right to the LDEV 171 designated in the received I/O command. Here, it is assumed that MP_PK_1 has lost the owner right to the LDEV 171 as a result of the updating of the owner right information in MP_PK_1.

MP_PK_1 transmits an access disapproval notification to CHA_PK_1 after judging that it does not have the owner right. Additionally, MP_PK_1 transmits the already updated owner right information 324 (the latest owner right information) along with the access disapproval notification to CHA_PK_1. Incidentally, the owner right information 324 transmitted may include only a difference resulting from the updating (S713).

Upon receipt of the access disapproval notification and the owner right information 324 (an entirety thereof, or a difference resulting from the updating) from MP_PK_1, CHA_PK_1 updates, based on the received owner right information 324, the owner right information 314 retained by itself.

Subsequently, based on the updated owner right information 314, CHA_PK_1 newly specifies MP_PK 12 having the owner right to the LDEV 171 designated as the access target in the I/O request received earlier from the host apparatus 20. Then, CHA_PK_1 retransmits an I/O command to MP_PK 12 thus newly specified (assumed to be MP_PK_2 here) (S714).

Upon receipt of the I/O command from CHA_PK_1, MP_PK_2 refers to the owner right information 324 stored in the memory 123 of its own, and thereby judges whether it currently has the owner right to the LDEV 171 designated in the received I/O command. Here, as the owner right information in MP_PK_2 is already updated, MP_PK_2 confirms that it has the owner right, and then transmits to DKA_PK 13 a disk I/O which is directed to the LDEV 171 designated in the received I/O command (S715). Thereafter, notification (data having been read out or a completion report) is provided to the host apparatus 20 as appropriate in the same manner as in the processing in S614 and S615 in FIG. 6A.

Next, details of the processing in the first aspect will be described in connection with FIG. 7B. Upon receipt of an I/O request from the host apparatus 20 (S721), CHA_PK_1 refers to the owner right information 314 stored in the memory 113 of its own, and thereby specifies MP_PK 12 having the owner right to one of the LDEVs 171 which is designated as an access target in the I/O request (S722). Then, CHA_PK_1 transmits an I/O command to MP_PK 12 thus specified (it is assumed that MP_PK_1 is specified here) (S723).

Upon receipt of the I/O command from CHA_PK_1, MP_PK_1 refers to the owner right information 324 retained by itself, and thereby judges whether it currently has the owner right to the LDEV 171 designated in the received I/O command (S725). Here, if MP_PK_1 judges that it has the owner right thereto (YES in S725), it transmits to DKA_PK 13 a disk I/O which is directed to the LDEV 171 designated in the I/O command (S726). In this case, however, because MP_PK_1 has lost the owner right to the designated LDEV 171 as a result of the updating of the owner right information in MP_PK_1 (NO in S725), MP_PK_1 transmits to CHA_PK_1 an access disapproval notification and the updated owner right information 324 (the latest owner right information) retained by itself (S727).

Upon receipt of the access disapproval notification and the owner right information 324 (an entirety thereof, or a difference resulting from the updating) from MP_PK_1 (S728), CHA_PK_1 updates, based on the received owner right information 324, the owner right information 314 retained by itself (S729).

Subsequently, based on the updated owner right information 314, CHA_PK_1 newly specifies MP_PK 12 having the owner right to the LDEV 171 designated as the access target in the I/O request received earlier from the host apparatus 20 (S730). Then, CHA_PK_1 retransmits an I/O command to MP_PK 12 thus specified (assumed to be MP_PK_2 here) (S731).

Upon receipt of the I/O command from CHA_PK_1 (S732), MP_PK_2 refers to the owner right information 324 retained by itself, thereby confirms that it has the owner right to the LDEV 171 designated in the received I/O command, and then transmits to DKA_PK 13 a disk I/O which is directed to the LDEV 171 designated in the received I/O command (S733).

Thereafter, notification (data having been read out or a completion report) is provided to the host apparatus 20 as appropriate in the same manner as in the processing in S614 and S615 in FIG. 6A.

As has been described above, in a case where the owner right information in any one of CHA_PKs 11 is not yet updated while the owner right information in MP_PKs 12 is already updated, a not-yet-updated status of the owner right information in CHA_PKs 11 is automatically detected as the storage apparatus 10 receives an I/O request from the host apparatus 20. Then, the latest owner right information (an entirety thereof, or a difference resulting from the updating) is automatically transmitted, from MP_PK 12 retaining the already updated owner right information, to CHA_PK 11 retaining the not-yet-updated owner right information and having received an I/O request.

In this manner, according to the first aspect, an I/O request received from the host apparatus 20 can be correctly processed even in a case where contents in the owner right information 314 are different from (asynchronous with) the latest contents. For this reason, even when the updating in an entirety of the storage apparatus 10 has not been completed yet while the processing of updating the owner right information described in connection with FIGS. 5A to 5C for example is going on in the background, an I/O request received from the host apparatus 20 can be correctly processed. Additionally, even when the owner right information in some of CHA_PKs 11 and MP_PKs 12 has not been correctly updated due to some trouble or abnormality, an I/O request received from the host apparatus 20 can be correctly processed.

Additionally, the owner right information in CHA_PKs 11 is automatically updated at the same time as the storage apparatus 10 receives an I/O request from the host apparatus 20, whereby the owner right information in CHA_PK 11 can be automatically updated without having the owner right information updated, for example, through the aspects shown in FIGS. 5A to 5C. For this reason, the owner right information in CHA_PKs 11 can be updated without limiting or discontinuing reception of I/O requests from the host apparatus 20, for example, so as to update the owner right information in CHA_PKs 11. For this reason, an influence on the host apparatus 20, which is caused by processing for updating the owner right information, namely, overhead can be reduced.

Additionally, in a case where the owner right information in CHA_PKs 11 is updated by any one of the aspects shown in FIGS. 5A and 5B, if an I/O request is issued to CHA_PK 11 for which the updating in the background has not been completed yet, the owner right information in CHA_PKs 11 is automatically updated at the processing with respect to the I/O request. For this reason, the storage apparatus 10 can properly execute I/O processing with respect to the I/O request, and can properly respond to the host apparatus 20.

<Second Aspect>

Figure 8A:
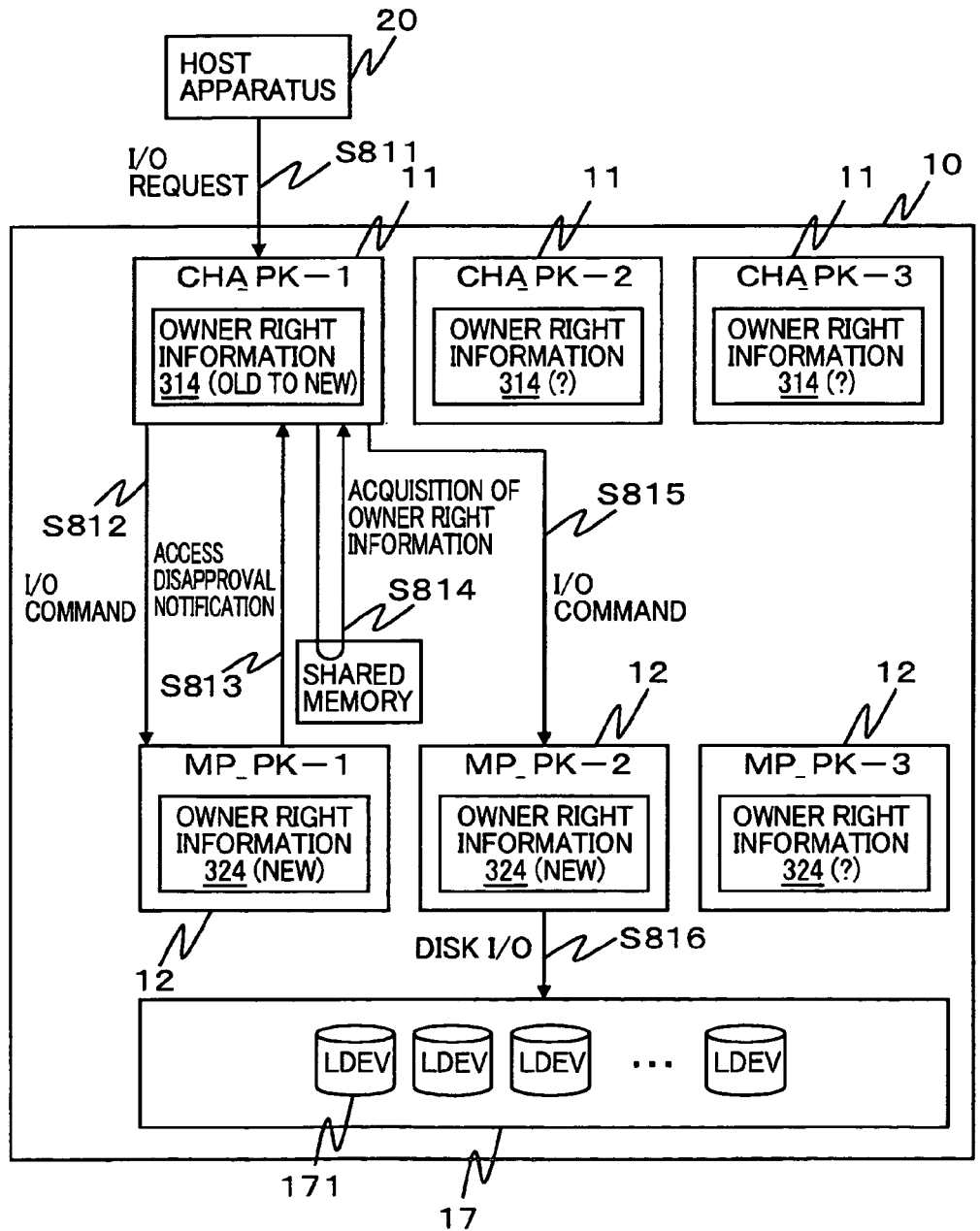
FIG. 8A is a diagram explaining a second aspect.
Figure 8B:
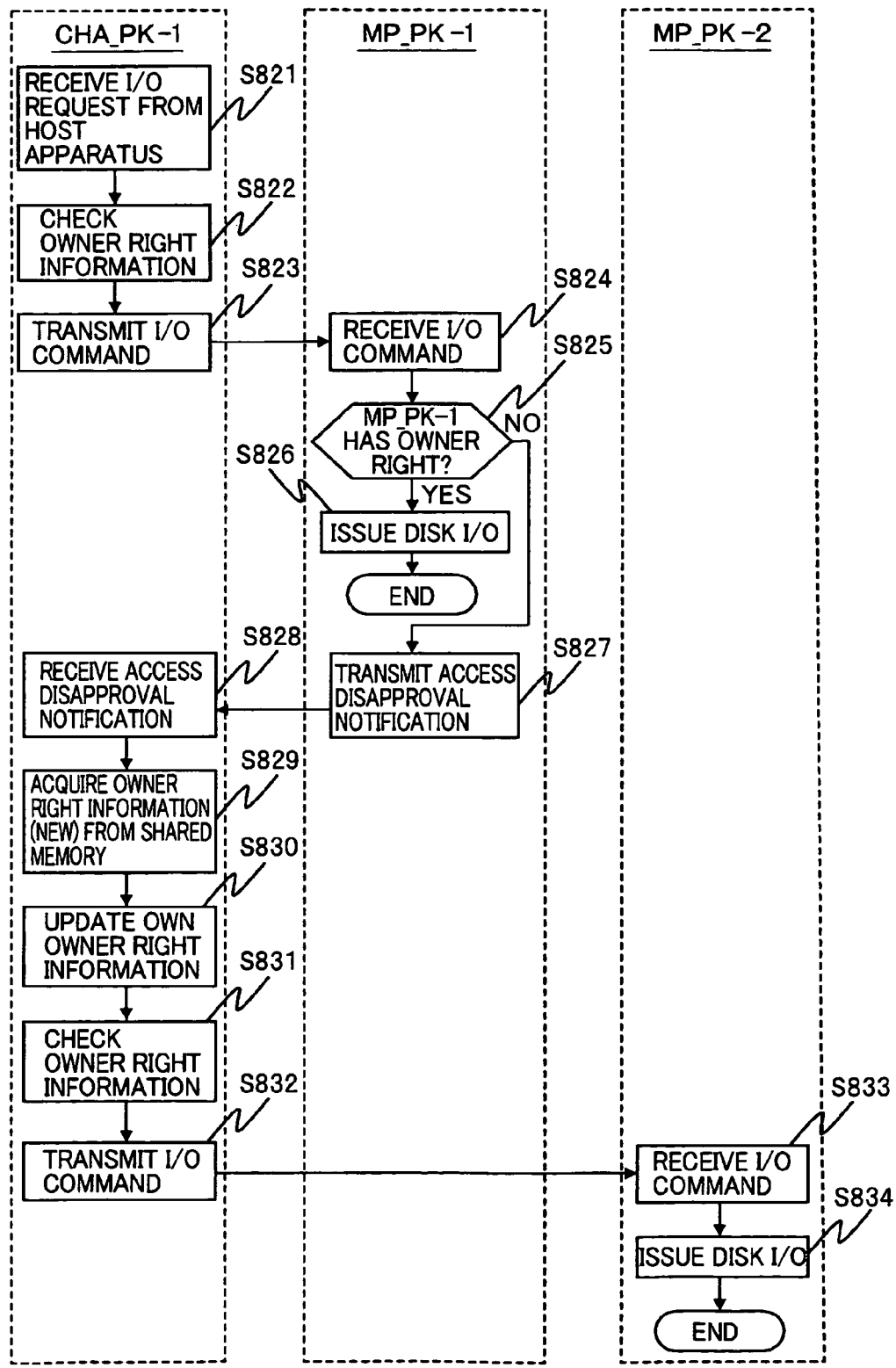
FIG. 8B is a flowchart explaining processing of the storage apparatus 10 in the second aspect.

A second aspect will be described next. FIG. 8A is a diagram explaining the second aspect, and FIG. 8B is a flowchart explaining processing of the storage apparatus 10 in the second aspect.

In the second aspect, as in the first aspect, it is assumed that, while the owner right information in MP_PKs 12 is already updated, the owner right information in CHA_PKs 11 is not yet updated. The second aspect is different from the first aspect in that CHA_PK 11 acquires the owner right information not from MP_PK 12 but from the shared memory 15.

Hereinbelow, as in the first aspect, description will be given of a case where, while the owner right information in MP_PK_1 and MP_PK_2 is already updated, the owner right information in CHA_PK_1 is not yet updated. Additionally, it is assumed that there is the latest owner right information (an entirety thereof or a difference resulting from the updating) stored in the shared memory 15 by the management apparatus 30 or the like.

First of all, description will be given in connection with FIG. 8A. Upon receipt of an I/O request from the host apparatus (S811), CHA_PK_1 refers to the owner right information 314 stored in the memory 113 of its own, and thereby specifies MP_PK 12 having the owner right to one of the LDEVs 171 which is designated as an access target in the I/O request. Then, CHA_PK_1 transmits an I/O command to MP_PK 12 thus specified (it is assumed that MP_PK_1 is specified here) (S812).

Upon receipt of the I/O command from CHA_PK_1, MP_PK_1 refers to the owner right information 324 retained by itself, and thereby judges whether it currently has the owner right to the LDEV 171 designated in the received I/O command. Here, it is assumed that MP_PK_1 has lost the owner right to that designated LDEV 171 as a result of the updating of the owner right information in MP_PK_1. MP_PK_1 transmits an access disapproval notification to CHA_PK_1 after judging that it does not have the owner right.

Upon receipt of the access disapproval notification from MP_PK_1, CHA_PK_1 itself acquires the owner right information (an entirety thereof, or a difference resulting from the updating) by accessing the shared memory 15, and updates, based on the acquired owner right information 324, the owner right information 314 retained by itself (S814). Subsequently, based on the updated owner right information 314, CHA_PK_1 newly specifies MP_PK 12 having the owner right to the LDEV 171 designated as the access target in the I/O request received earlier from the host apparatus 20. Then, CHA_PK_1 retransmits an I/O command to MP_PK 12 thus specified (assumed to be MP_PK_2 here) (S815).

Upon receipt of the I/O command from CHA_PK_1, MP_PK_2 refers to the owner right information 324 stored in the memory 123 of its own, and thereby judges whether it currently has the owner right to the LDEV 171 designated in the received I/O command. Here, as the owner right information in MP_PK_2 is already updated, MP_PK_2 confirms that it has the owner right to the designated LDEV 171, and then transmits to DKA_PK 13 a disk I/O which is directed to the LDEV 171 designated in the received I/O command (S816). Thereafter, notification (data having been read out or a completion report) is provided to the host apparatus 20 as appropriate in the same manner as in the processing in S614 and S615 in FIG. 6A.

Next, details of the processing in the second aspect will be described in connection with FIG. 8B. Processing in S821 to S826 in this drawing is the same as the processing in S721 to S726 in FIG. 7B.

In S827, unlike in S727 in the first aspect, MP_PK_1 transmits only an access disapproval notification to CHA_PK_1.

Upon receipt of the access disapproval notification from MP_PK_1 (S828), CHA_PK_1 acquires the latest owner right information by accessing the shared memory 15 (S829). Then, based on the acquired owner right information, CHA_PK_1 updates the owner right information 314 retained by itself (S830).

Processing in S831 to S834 is the same as the processing in S730 to S733 in FIG. 7B. Following this processing, notification (data having been read out or a completion report) is provided to the host apparatus 20 as appropriate in the same manner as in the processing in S614 and S615 in FIG. 6A.

The second aspect described above produces the same effects as the aforementioned first aspect. Additionally, in the second aspect, CHA_PK 11 acquires the latest owner right information not from MP_PK 12 but from the shared memory 15. For this reason, increase of a load on MP_PK 12 can be suppressed at the time of updating the owner right information in CHA_PK 11. Furthermore, a communication load between MP_PK 12 and CHA_PK 11 can be suppressed. The second aspect is effective, for example, in a situation where reduction of a load on MP_PK 12 is emphasized.

<Third Aspect>

Figure 9A:
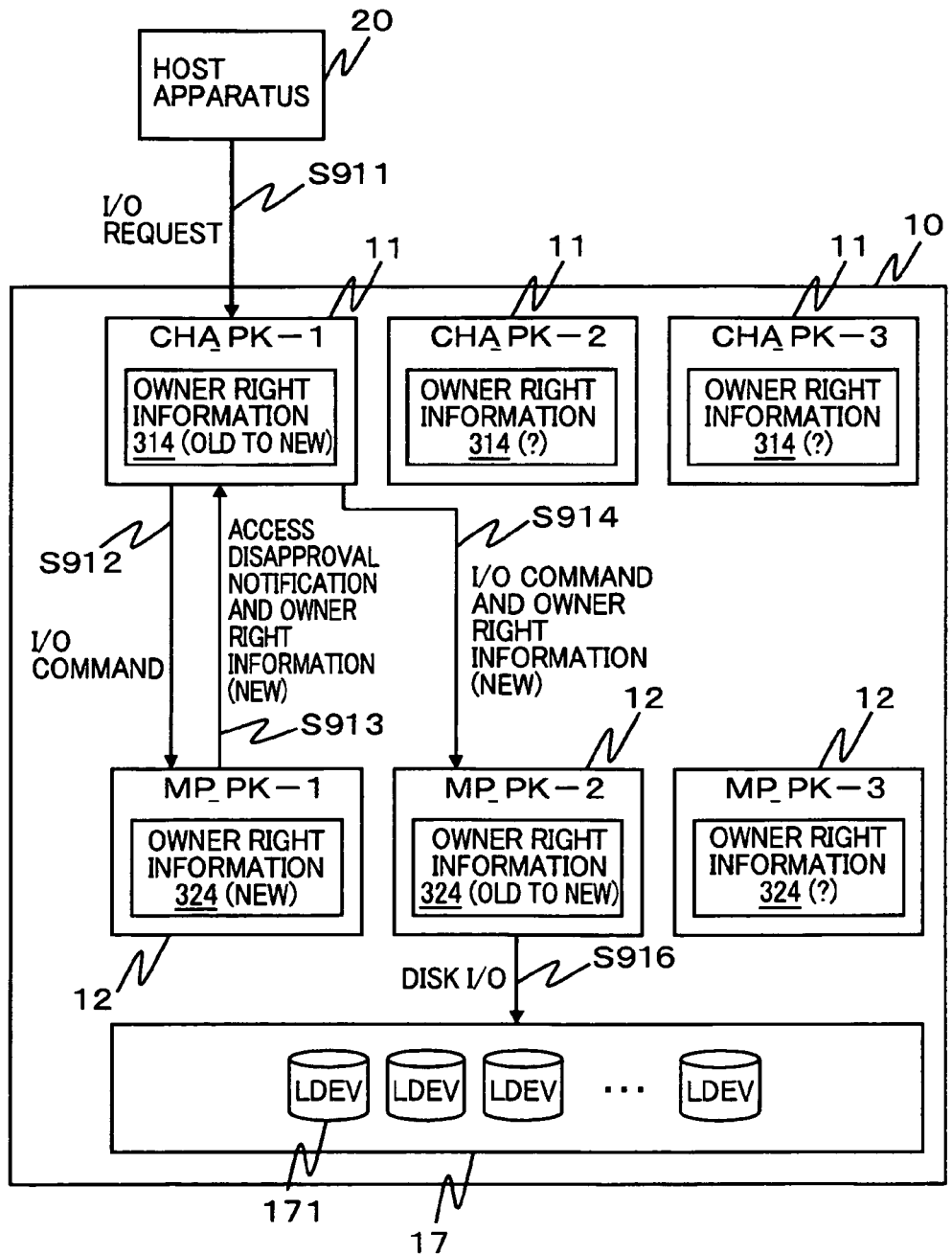
FIG. 9A is a diagram explaining a third aspect.
Figure 9B:
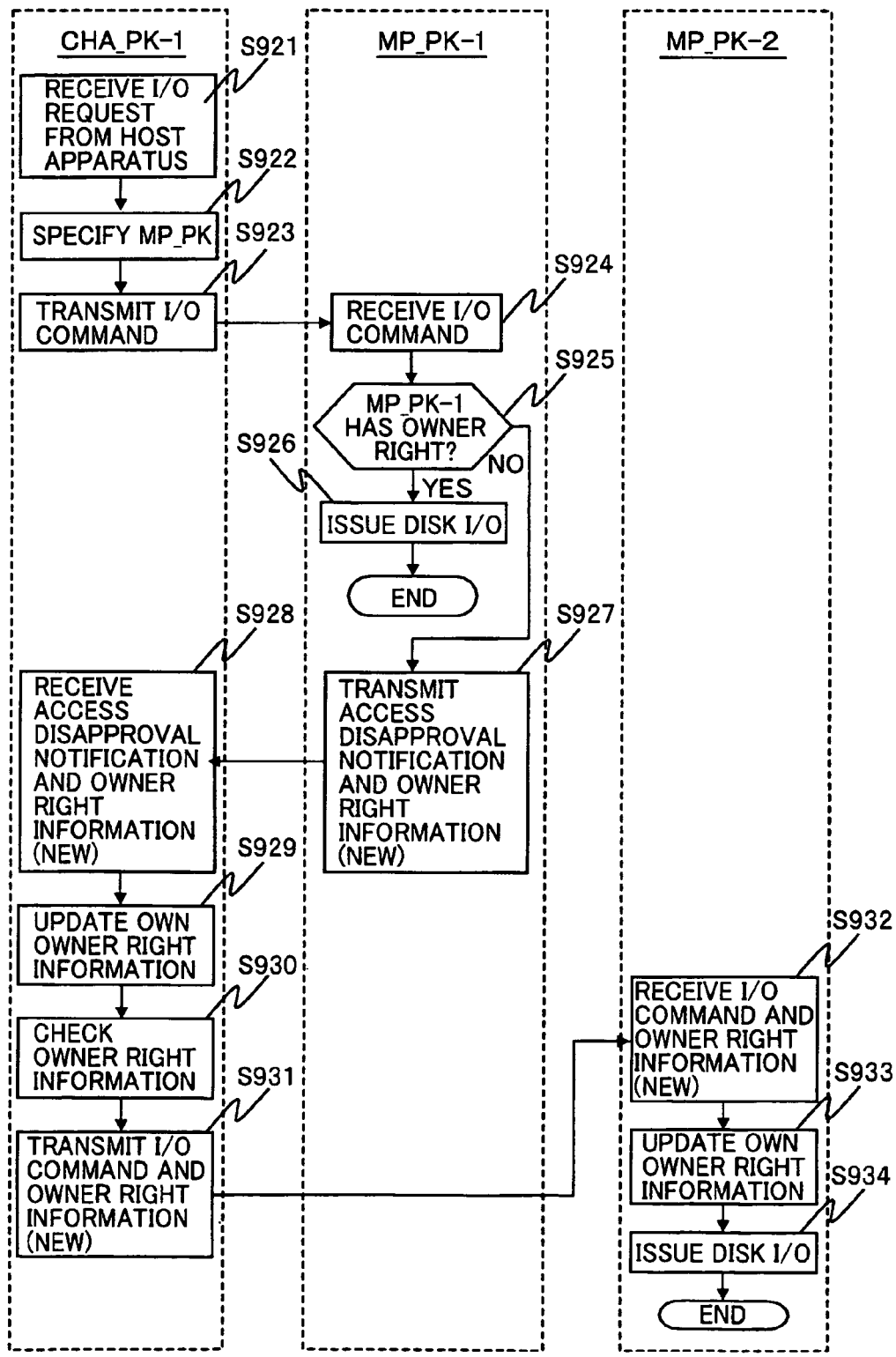
FIG. 9B is a flowchart explaining processing of the storage apparatus 10 in the third aspect.

A third aspect will be described next. FIG. 9A is a diagram explaining the third aspect, and FIG. 9B is a flowchart explaining processing of the storage apparatus 10 in the third aspect.

In the third aspect, when the I/O command is retransmitted from CHA_PK_1 to MP_PK_2 in S714 in the first aspect shown in FIG. 7A, CHA_PK_1 transmits, along with the I/O command, the latest owner right information (an entirety thereof, or a difference resulting from the updating) acquired by CHA_PK_1 itself from MP_PK_1. Accordingly, FIG. 9A is different from FIG. 7A only with respect to processing in S914 corresponding to S714.

Next, details of the processing in the third aspect will be described in connection with FIG. 9B. Processing in S921 to S929 in this drawing is the same as the processing in S721 to S729 in FIG. 7B.

In S930, based on the updated owner right information 314, CHA_PK_1 newly specifies MP_PK 12 having the owner right to the LDEV 171 designated as the access target in the I/O request received earlier from the host apparatus 20 (S930). Then, CHA_PK_1 retransmits an I/O command and the latest owner right information 314 (an entirety thereof, or a difference resulting from the updating) to MP_PK 12 specified (assumed to be MP_PK_2 here) (S931).

Upon receipt of the I/O command and the owner right information 314 from CHA_PK_1 (S932), MP_PK_2 updates, in accordance with the received latest owner right information 314, the owner right information 324 retained by itself (S933). Then, MP_PK_2 refers to the updated owner right information 324, thereby confirms that it has the owner right to the LDEV 171 designated in the received I/O command, and then issues to DKA_PK 13 a disk I/O which is directed to the LDEV 171 designated in the received I/O command (S934). Thereafter, notification (data having been readout or a completion report) is provided to the host apparatus 20 as appropriate in the same manner as in the processing in S614 and S615 in FIG. 6A.

According to the third aspect, MP_PK_2 can issue a disk I/O to the LDEV 171 based on the latest owner right information even when the owner right information 324 in MP_PK_2 is not yet updated to the latest contents for any reason. The third aspect is effective in such cases as when the owner right information 324 in MP_PK_2 is not yet updated to the latest contents for any reason.

<Fourth Aspect>

Figure 10A:
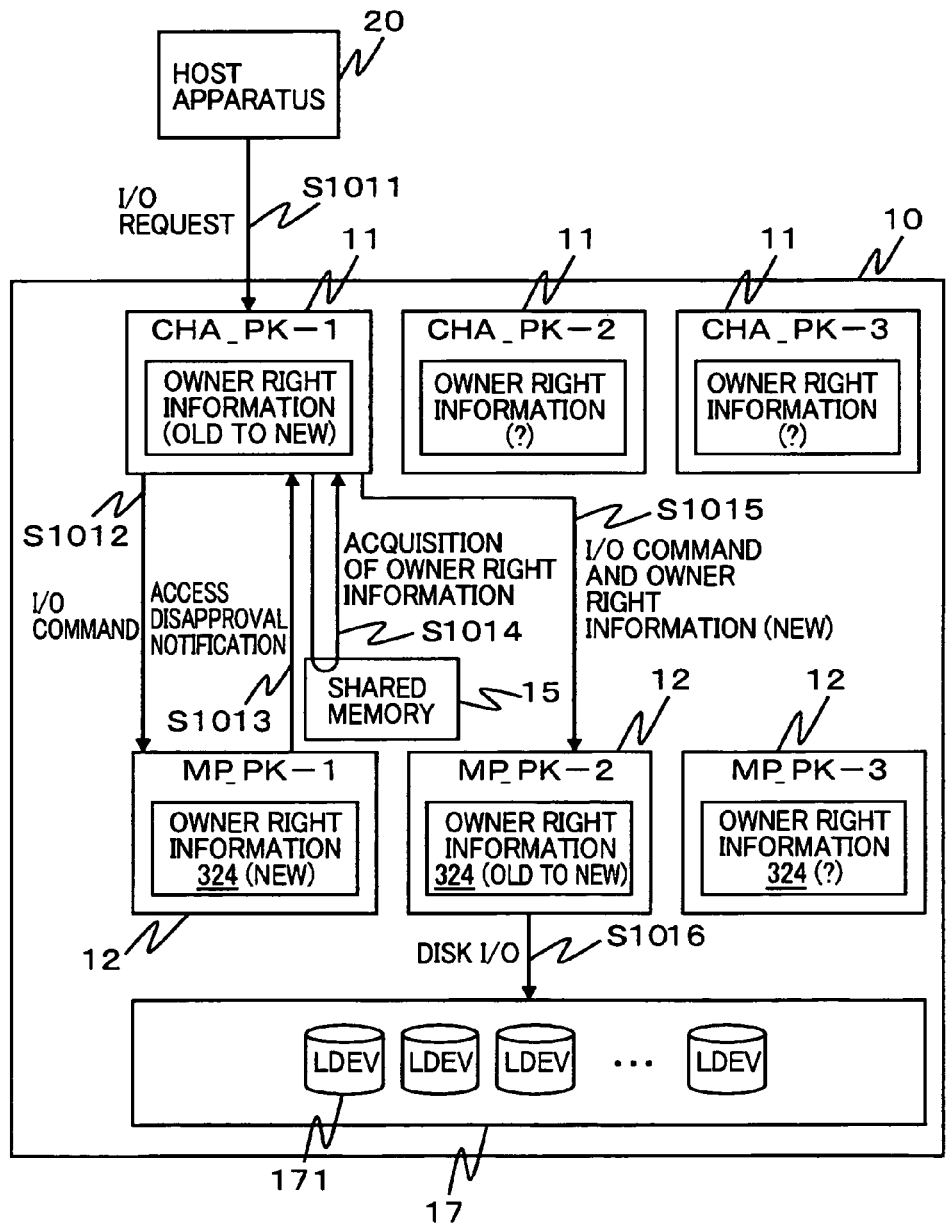
FIG. 10A is a diagram explaining a fourth aspect.

A fourth aspect will be described next. FIG. 10A is a diagram explaining the fourth aspect, and FIG. 10B is a flowchart explaining processing of the storage apparatus 10 in the fourth aspect.

The fourth aspect is similar to the third aspect, but different from the third aspect in that it is based on the second aspect. More specifically, the fourth aspect is different from the third aspect in that, upon receipt of an access disapproval notification from MP_PK_1, CHA_PK_1 itself acquires the owner right information from the shared memory 15.

Figure 10B:
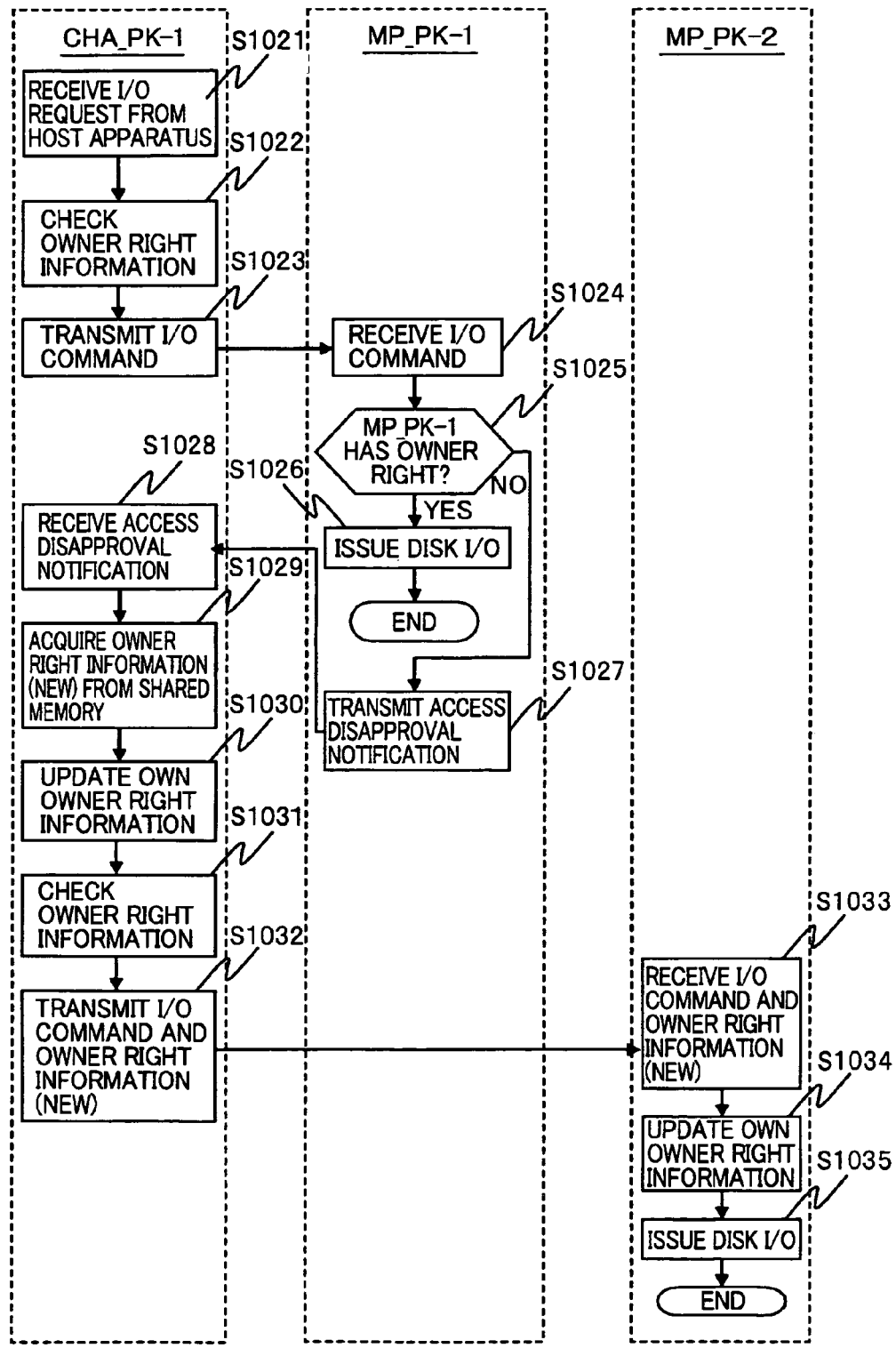
FIG. 10B is a flowchart explaining processing of the storage apparatus 10 in the fourth aspect.

Processing in S1021 to S1030 in FIG. 10B is the same as the processing in S821 to S830 in FIG. 8B. Additionally, processing from S1031 to S1035 in this drawing is the same as the processing from S930 to 934.

The fourth aspect produces the effects produced respectively by the second and third aspects. That is, according to the fourth aspect, CHA_PK 11 acquires the latest owner right information not from MP_PK 12 but from the shared memory 15, whereby a load on MP_PK 12 can be suppressed at the time of updating the owner right information in CHA_PK 11. Additionally, a communication load between MP_PK 12 and CHA_PK 11 can be suppressed. Furthermore, MP_PK_2 can issue a disk I/O to an LDEV based on the latest owner right information even when the owner right information 324 in MP_PK_2 is not yet updated to the latest contents for any reason.

<Fifth Aspect>

Figure 11A:
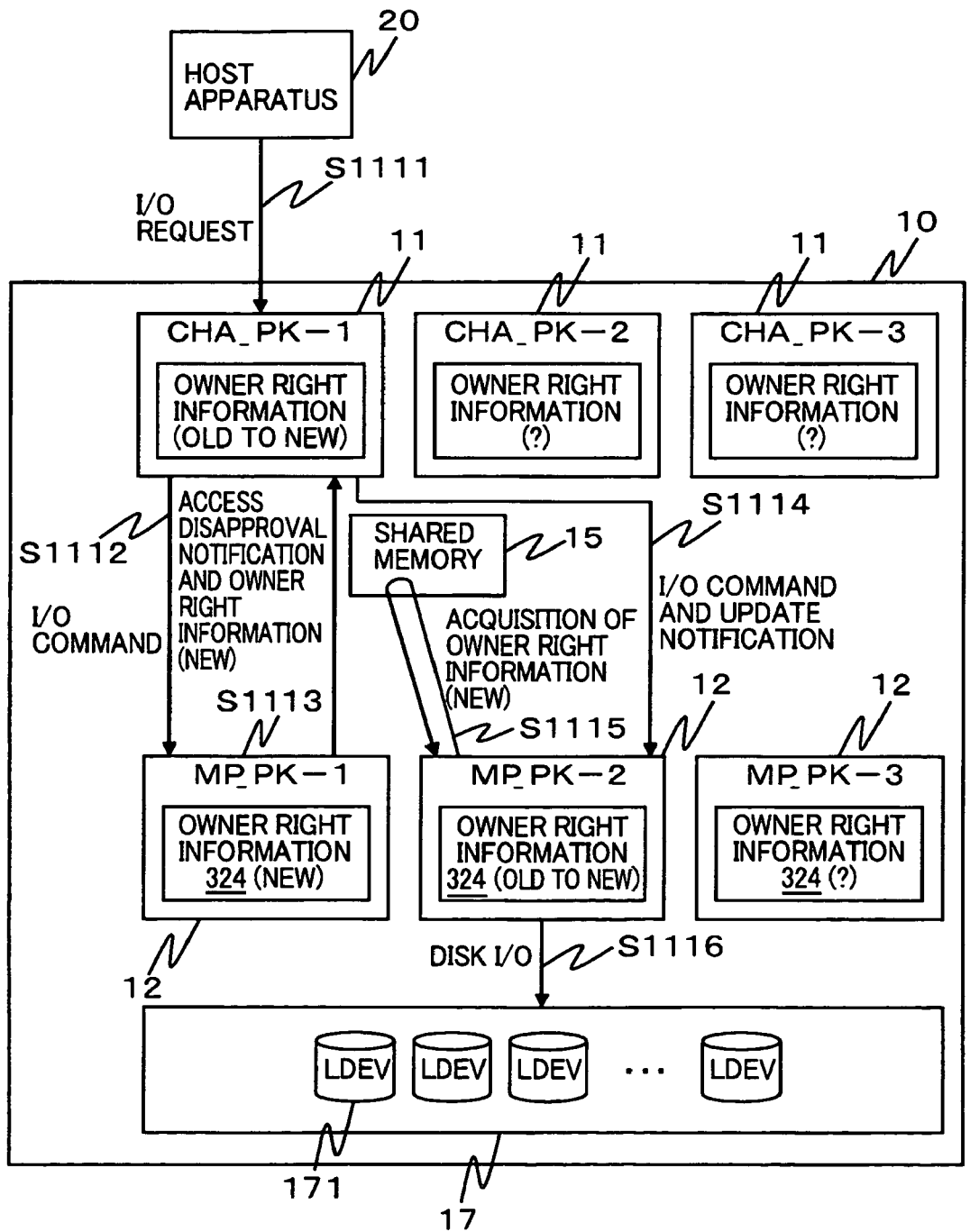
FIG. 11A is a diagram explaining a fifth aspect.
Figure 11B:
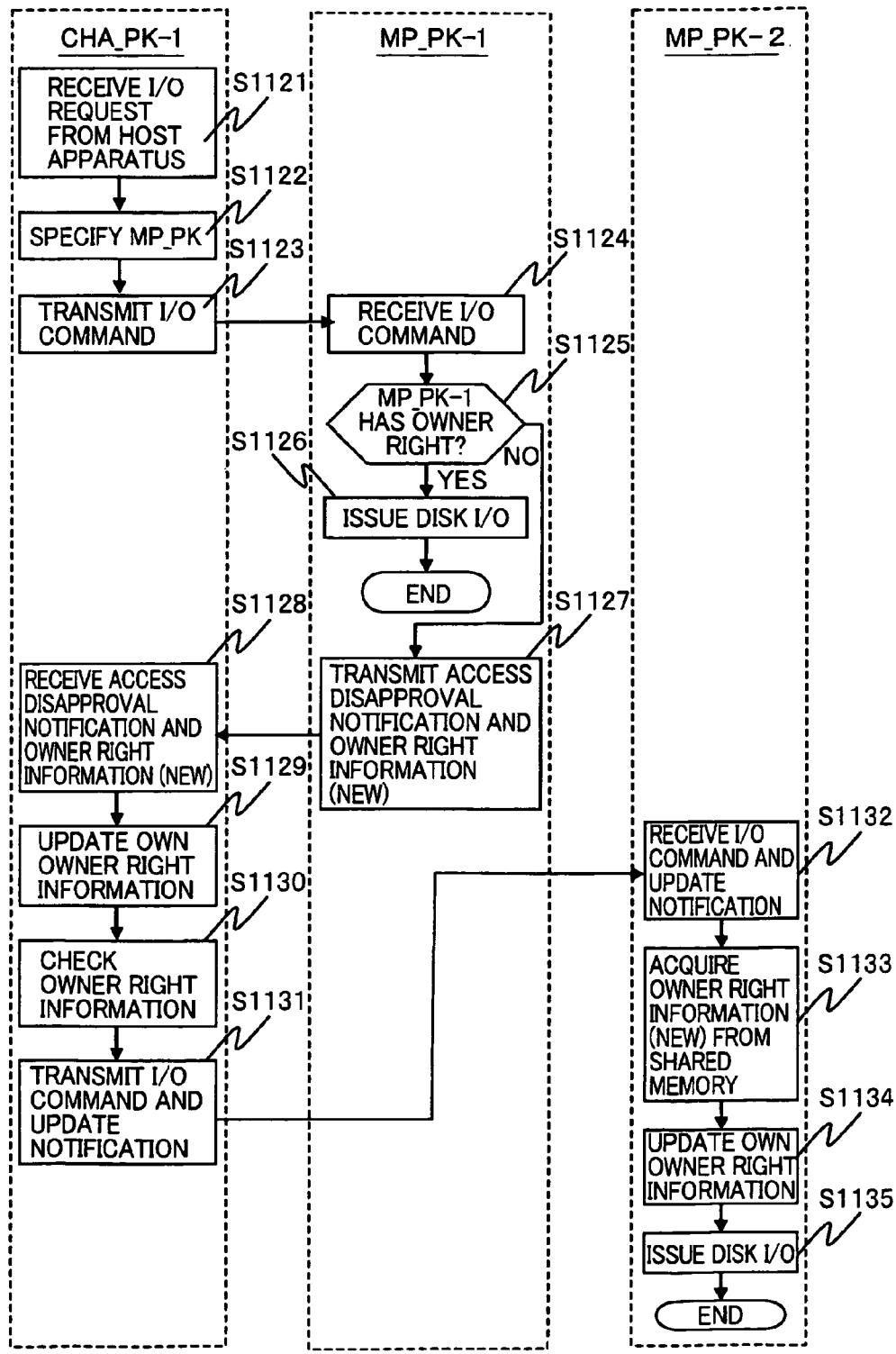
FIG. 11B is a flowchart explaining processing of the storage apparatus 10 in the fifth aspect.

A fifth aspect will be described next. FIG. 11A is a diagram explaining the fifth aspect, and FIG. 11B is a flowchart explaining processing of the storage apparatus 10 in the fifth aspect. Hereinbelow, the fifth aspect will be described in connection with each of these drawings.

The fifth aspect is similar to the third aspect, but different from the third aspect in that, as shown in FIG. 11A, after CHA_PK_1 transmits an owner right information update notification along with the I/O command to MP_PK_2, and MP_PK_2 itself accesses the shared memory 15 upon receipt of the update notification to acquire the owner right information (S1114).

In FIG. 11B, processing in S1121 to S1130 is the same as the processing in S921 to S930 in FIG. 9B. In S1131, CHA_PK_1 transmits an owner right information update notification along with an I/O command. In S1132, MP_PK_2 receives the owner right information update notification along with the I/O command. In S1133, MP_PK_2 itself accesses the shared memory 15 to acquire the owner right information. Processing in S1134 and S1135 in this drawing is the same as the processing in S933 and S934.

The fifth aspect produces the effects produced by the third aspect. That is, according to the fifth aspect, MP_PK_2 can issue a disk I/O to the LDEV 171 based on the latest owner right information even when the owner right information 324 in MP_PK_2 is not yet updated to the latest contents for any reason. Additionally, MP_PK_2 itself accesses the shared memory 15 to acquire the owner right information, whereby a load on CHA_PK_1 can be suppressed. Furthermore, a communication load between MP_PK 12 and CHA_PK 11 can be suppressed as well.

<Sixth Aspect>

Figure 12A:
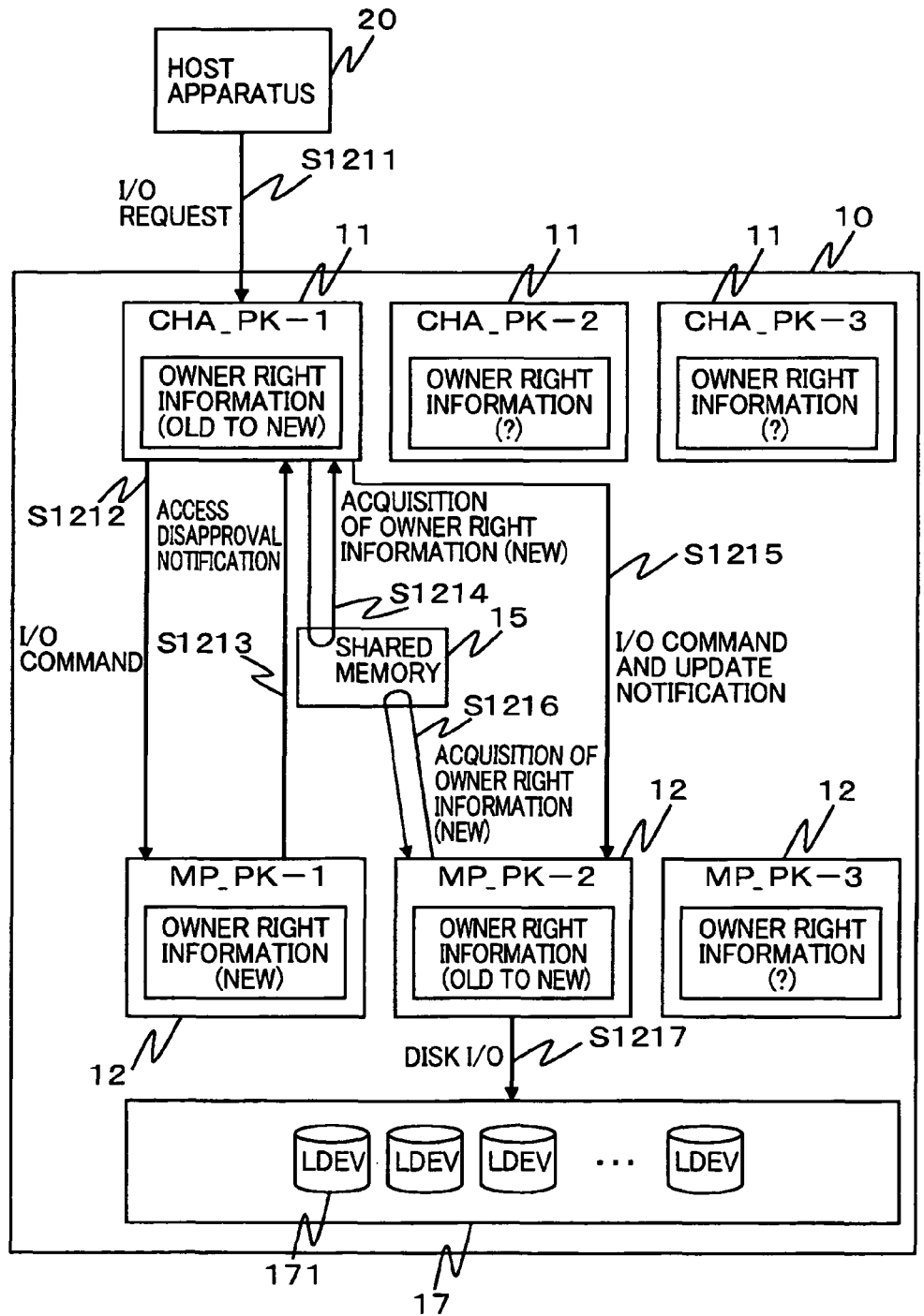
FIG. 12A is a diagram explaining a sixth aspect.

A sixth aspect will be described next. FIG. 12A is a diagram explaining the sixth aspect, and FIG. 12B is a flowchart explaining processing of the storage apparatus 10 in the sixth aspect.

The sixth aspect is based on the second and fifth aspects. That is, the six aspect is obtained by applying the fifth aspect to the second aspect. More specifically, after CHA_PK_1 itself accesses the shared memory 15 to acquire the owner right information (S1215), MP_PK_2, which has received the owner right information update notification from CHA_PK_1, itself accesses the shared memory 15 to acquire the owner right information (S1216).

Figure 12B:
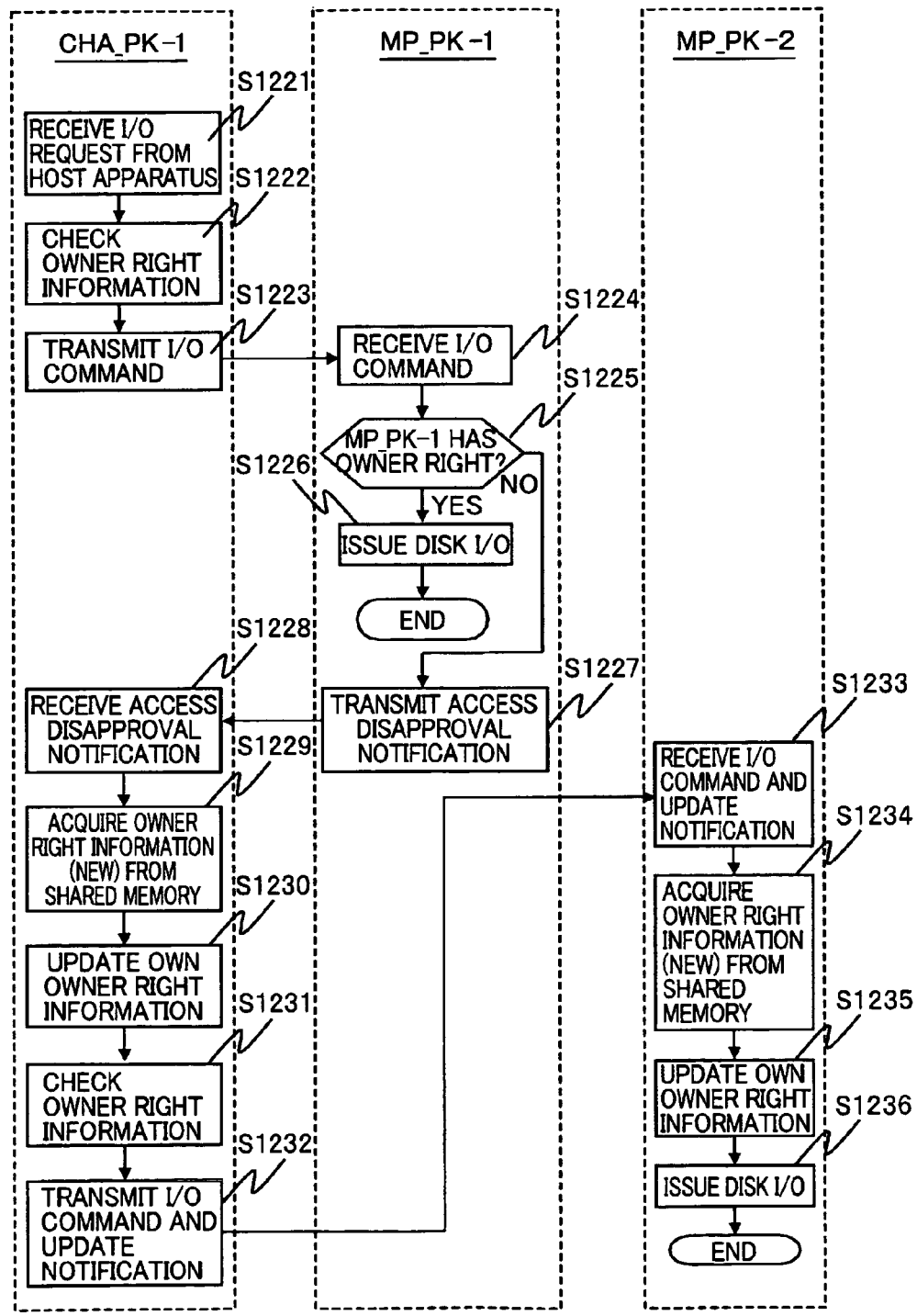
FIG. 12B is a flowchart explaining processing of the storage apparatus 10 in the sixth aspect.

Processing in S1221 to S1231 in FIG. 12B is the same as the processing in S821 to S831 in FIG. 8B. Additionally, processing in S1232 to S1236 is the same as the processing in S1131 to S1135 shown in FIG. 11B.

The sixth aspect produces the effects produced respectively by the second and fifth aspects. Additionally, as a result of its production of the effects of these respective aspects, loads on CHA_PK 11 and MP_PK 12 for updating the owner right information in some other CHA_PK 11 and MP_PK 12 (that are different from themselves) can be suppressed. Additionally, each CHA_PK 11 and each MP_PK 12 can retain resources for processing for themselves. Additionally, a communication load between each CHA_PK 11 and each MP_PK 12 is reduced, whereby a communication band of the storage apparatus 10 can be secured for other data transfers and the like which are performed between CHA_PK 11 and MP_PK 12.

Although the embodiment has been described hereinabove, the above described embodiment is intended to facilitate understanding of the present invention, and is not intended for limited interpretation of the present invention. The present invention can be changed or improved without departing from the spirit thereof, and includes equivalents thereof.

The invention claimed is:

1. A storage apparatus comprising:
    a plurality of channel packages communicating with an external apparatus;
    a plurality of microprocessor packages;
    a disk package that controls a disk device;
    a cache memory accessible by the channel packages and the microprocessor packages; and
    a shared memory accessible by the microprocessor packages, wherein:
    the disk device provides logical volumes which are based on a storage area of a physical disk;
    the channel packages and the microprocessor packages store therein control information designating which ones of the logical volumes accessible by the respective microprocessor packages;

when anyone of the channel packages receives an I/O request from the external apparatus, the one channel package specifies, based on the control information stored therein, one of the microprocessor packages which has an access right to one of the logical volumes to which the I/O request is directed, and then transmits an I/O command to the specified microprocessor package;

upon receipt of the I/O command from the one channel package, the specified microprocessor package judges based on the control information stored therein whether the specified microprocessor package itself has an access right to the one logical volume to which the I/O command is directed;

the specified microprocessor package transmits a disk I/O to the disk package when judging that the specified microprocessor package has the access right to the one logical volume;

the specified microprocessor package transmits the control information stored therein to the one channel package having transmitted the I/O command when judging that the specified microprocessor package does not have the access right to the one logical volume to which the I/O command is directed; and the one channel package receives the control information from the specified microprocessor package, updates based on the received control information the control information stored therein, based on the updated control information, newly specifies another one of the microprocessor packages which has an access right to the one logical volume to which the I/O request is directed, and transmits an I/O command to the newly specified microprocessor package, the control information in an updated status is stored in the shared memory;

when transmitting the I/O command to the newly specified microprocessor package, the one channel package transmits a notification along with the I/O command to the newly specified microprocessor package, the notification indicating that the control information has been updated; and upon receipt of the I/O command and the notification, the newly specified microprocessor package accesses the shared memory to acquire the control information stored in the shared memory, updates, based on the acquired control information, the control information stored therein, judges based on the updated control information whether the newly specified microprocessor package itself has an access right to the one logical volume to which the I/O command is directed, and transmits a disk I/O to the disk package when judging that the newly specified microprocessor package has the access right to the one logical volume.

2. A storage apparatus comprising:

a plurality of channel packages communicating with an external apparatus;

a plurality of microprocessor packages;

a disk package that controls a disk device;

a cache memory accessible by the channel packages and the microprocessor packages; and a shared memory accessible by the channel packages, wherein:

control information in an updated status is stored in the shared memory;

the disk device provides logical volumes which are based on a storage area of a physical disk;

the channel packages and the microprocessor packages store therein control information designating which ones of the logical volumes are accessible by the respective microprocessor packages;

when anyone of the channel packages receives an I/O request from the external apparatus, the one channel package specifies, based on the control information stored therein, one of the microprocessor packages which has an access right to one of the logical volumes to which the I/O request is directed, and transmits an I/O command to the specified microprocessor package;

upon receipt of the I/O command from the one channel package, the specified microprocessor package judges based on the control information stored therein whether the specified microprocessor package itself has an access right to the one logical volume to which the I/O command is directed, the specified microprocessor package transmits a disk I/O to the disk package when judging that the specified microprocessor package has the access right to the one logical volume, and the specified microprocessor package transmits a notification to the one channel package having transmitted the I/O command, the notification indicating that the specified microprocessor package does not have the access right to the one logical volume, when judging that the specified microprocessor package does not have the access right to the one logical volume to which the I/O command is directed; and upon receipt of the notification, the one channel package accesses the shared memory to acquire the control information stored in the shared memory, updates, based on the acquired control information, the control information stored therein, based on the updated control information, newly specifies another one of the microprocessor packages which has an access right to the one logical volume to which the I/O request is directed, and transmits an I/O command to the newly specified microprocessor package, wherein the shared memory is accessible by the microprocessor packages;

when transmitting the I/O command to the newly specified microprocessor package, the one channel package transmits a notification along with the I/O command to the newly specified microprocessor package, the notification indicating that the control information has been updated; and upon receipt of the I/O command and the notification, the newly specified microprocessor package accesses the shared memory to acquire the control information stored in the shared memory, updates, based on the acquired control information, the control information stored therein, judges based on the updated control information whether the newly specified microprocessor package itself has an access right to the one logical volume to which the I/O command is directed, and transmits a disk I/O to the disk package when judging that the newly specified microprocessor package has the access right to the one logical volume.

* * * * *